(12) United States Patent
Cady et al.

(10) Patent No.: US 12,049,400 B2
(45) Date of Patent: Jul. 30, 2024

(54) INTEGRATED HYDROGEN PRODUCTION AND BIO-RENEWABLE CONVERSION PROCESS

(71) Applicant: UOP LLC, Des Plaines, IL (US)

(72) Inventors: William Cady, Chicago, IL (US); Elizabeth Carter, Arlington Heights, IL (US); Bradley Russell, Carol Stream, IL (US); James T. Wexler, Wheaton, IL (US); Addison Cruz, Chicago, IL (US); Erick J. Bennett, III, Orland Park, IL (US); Kurt Kraus, Tulsa, OK (US); Stefano Bietto, Tulsa, OK (US); Kyle Cuellar, Fulshear, TX (US); Oluwaseyi Kayode, Houston, TX (US); Suryanarayana Murthy Konda Naga Venkata, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 18/176,022

(22) Filed: Feb. 28, 2023

(65) Prior Publication Data

US 2023/0202841 A1    Jun. 29, 2023

Related U.S. Application Data

(63) Continuation of application No. 17/508,349, filed on Oct. 22, 2021.

(Continued)

(51) Int. Cl.
*C10G 3/00* (2006.01)
*C01B 3/48* (2006.01)
*C01B 3/50* (2006.01)

(52) U.S. Cl.
CPC .............. *C01B 3/48* (2013.01); *C01B 3/501* (2013.01); *C01B 3/508* (2013.01); *C10G 3/42* (2013.01); *C10G 3/52* (2013.01); *C01B 2203/0216* (2013.01); *C01B 2203/0283* (2013.01); *C01B 2203/0405* (2013.01); *C01B 2203/043* (2013.01); *C01B 2203/065* (2013.01); *C01B 2203/1235* (2013.01); *C01B 2203/86* (2013.01);

(Continued)

(58) Field of Classification Search
CPC .............. C01B 3/48; C01B 3/50; C10G 3/00
USPC .................................. 423/655, 620, 626, 612
See application file for complete search history.

(56) References Cited

U.S. PATENT DOCUMENTS

| 4,300,009 A | 11/1981 | Haag et al. |
| 4,772,420 A | 9/1988 | Pinto et al. |

(Continued)

FOREIGN PATENT DOCUMENTS

| FR | 2961802 A1 | 12/2011 |
| WO | 2007123673 A1 | 11/2007 |
| WO | 2019133598 A1 | 7/2019 |

OTHER PUBLICATIONS

International Search Report from PCT application No. PCT/US2022/071386, mailed on Jul. 13, 2022.

(Continued)

*Primary Examiner* — Sharon Pregler

(57) ABSTRACT

A bio-renewable conversion process for making fuel from bio-renewable feedstocks is combined with a hydrogen production process that includes recovery of $CO_2$. The integrated process uses a purge gas stream comprising hydrogen from the bio-renewable hydrocarbon production process in the hydrogen production process.

10 Claims, 9 Drawing Sheets

Related U.S. Application Data

(60) Provisional application No. 63/220,848, filed on Jul. 12, 2021, provisional application No. 63/167,343, filed on Mar. 29, 2021, provisional application No. 63/167,341, filed on Mar. 29, 2021.

(52) U.S. Cl.
CPC ............... *C10G 2300/1011* (2013.01); *C10G 2300/4043* (2013.01); *C10G 2300/42* (2013.01); *C10G 2400/04* (2013.01); *C10G 2400/08* (2013.01)

(56) References Cited

U.S. PATENT DOCUMENTS

| | | | |
|---|---|---|---|
| 4,963,339 A | 10/1990 | Krishnamurthy et al. | |
| 4,992,605 A | 2/1991 | Craig et al. | |
| 6,875,008 B1 | 4/2005 | Martin et al. | |
| 7,776,208 B2 | 8/2010 | Guo | |
| 7,999,142 B2 | 8/2011 | Kalnes et al. | |
| 8,021,464 B2 | 9/2011 | Gauthier et al. | |
| 8,039,682 B2 | 10/2011 | McCall et al. | |
| 8,198,492 B2 | 6/2012 | Brady et al. | |
| 8,241,400 B2 | 8/2012 | Grover | |
| 8,303,930 B2* | 11/2012 | Chen | C01B 3/48 422/612 |
| 8,394,174 B2 | 3/2013 | Chen et al. | |
| 8,431,755 B2 | 4/2013 | Vauk | |
| 8,742,183 B2 | 6/2014 | McCall et al. | |
| 8,865,953 B2 | 10/2014 | Brady et al. | |
| 9,062,258 B2 | 6/2015 | Mayeur et al. | |
| 11,326,110 B2 | 5/2022 | Roy et al. | |
| 2004/0230085 A1 | 11/2004 | Jakkula et al. | |
| 2010/0288123 A1 | 11/2010 | Chen et al. | |
| 2010/0317748 A1* | 12/2010 | Hassan | C10G 2/344 518/700 |
| 2012/0121497 A1 | 5/2012 | Terrien et al. | |
| 2015/0376801 A1 | 12/2015 | Bairamijamal | |
| 2016/0250580 A1 | 9/2016 | Monereau et al. | |
| 2016/0312125 A1 | 10/2016 | Linck et al. | |
| 2018/0216010 A1 | 8/2018 | Hong | |
| 2019/0135626 A1 | 5/2019 | Rafati et al. | |
| 2019/0275460 A1 | 9/2019 | Zhong et al. | |

OTHER PUBLICATIONS

Written Opinion from PCT application No. PCT/US2022/071386, mailed on Jul. 13, 2022.
International Search Report from PCT application No. PCT/US2022/071388 mailed Jul. 14, 2022.
Written Opinion from PCT application No. PCT/US2022/071388 mailed Jul. 14, 2022.
International Search Report from PCT application No. PCT/US2022/071385 mailed Jul. 6, 2022.
International Search Report from PCT application No. PCT/US2022/071384 mailed Jul. 6, 2022.
Kraus, Kurt et al., U.S. Appl. No. 17/451,932 entitled Active and Passive Combustion Stabilization For Burners For Highly And Rapidly Varying Fuel Gas Compositions, filed Oct. 22, 2021.

* cited by examiner

INTEGRATED HYDROGEN PRODUCTION AND BIO-RENEWABLE CONVERSION PROCESS

RELATED APPLICATIONS

This application is a continuation of U.S. application Ser. No. 17/508,349 filed Oct. 22, 2021, entitled Integrated Hydrogen Production and Bio-Renewable Conversion Process, and claims the benefit of U.S. Provisional Application Ser. No. 63/220,848, filed Jul. 12, 2021, entitled Method of Recovering Hydrogen and $CO_2$ in a Hydrogen Production Unit; U.S. Provisional Application Ser. No. 63/167,343, filed Mar. 29, 2021, entitled Integrated Hydrogen Production and Bio-Renewable Conversion Process; and U.S. Provisional Application Ser. No. 63/167,341, filed Mar. 29, 2021, entitled Method of Recovering Hydrogen and $CO_2$ in a Hydrogen Production Unit, each of which is incorporated herein in its entirety.

BACKGROUND

Hydrogen is expected to have significant growth potential because it is a clean-burning fuel. However, hydrogen production is traditionally a significant emitter of $CO_2$, and government regulations and societal pressures are increasingly taxing or penalizing $CO_2$ emissions or incentivizing $CO_2$ capture. Consequently, significant competition to lower the cost of hydrogen production while recovering the byproduct $CO_2$ for subsequent geological sequestration to capture the growing market is anticipated. $CO_2$ can be separated as a vapor to be supplied to a common pipeline, but more likely it will need to be produced in liquefied form for easy transport by truck or ship due to the current lack of $CO_2$ pipeline infrastructure in certain areas of the world.

The desired level of $CO_2$ emissions mitigated will depend on regional economic conditions, with some hydrogen producers prioritizing maximizing hydrogen production with $CO_2$ capture, others prioritizing minimal $CO_2$ emissions with hydrogen production, and some falling somewhere in-between. Another important factor is the reformer technology chosen for a given hydrogen production unit. For steam reforming plants, 50% to 60% $CO_2$ capture may be sufficient, while greater than 90% or greater than 95% may be expected for an autothermal reformer (ATR), gasifier, or partial oxidation (POX) reformer.

Most existing hydrogen production processes utilize pressure swing adsorption (PSA) to recover high-purity product hydrogen from shifted syngas. The low-pressure tail gas stream from the PSA unit is typically combusted to generate heat or steam for the process. If no stream is sent to a combustor, a purge is required to prevent impurity build-up in the process.

U.S. Pat. No. 8,021,464 describes a process for the combined production of hydrogen and $CO_2$ from a mixture of hydrocarbons which are converted to syngas. The syngas is separated in a PSA unit into a hydrogen-enriched stream and a PSA offgas stream. The PSA offgas is compressed and dried, followed by several successive steps of condensing and separating the $CO_2$-rich condensate with the temperature being reduced at each step, the temperature ranging from ambient to −56° C. However, the process results in a purge stream containing a significant amount of $CO_2$ which must be removed from the process. A permeate module can be used to improve the separation, but at the cost of increased power requirements.

U.S. Pat. No. 8,241,400 describes a process for recovering hydrogen and $CO_2$ from a mixture of hydrocarbons utilizing a system that includes a reformer unit, an optional water gas shift reactor, a PSA unit, and a cryogenic purification unit or a catalytic oxidizer. The PSA unit produces three streams: a high-pressure hydrogen stream, a low-pressure $CO_2$ stream, and a $CH_4$ rich stream which is withdrawn during a $CO_2$ co-purge step. Purified $CO_2$ from the $CO_2$ purification unit in the process is used as the co-purge in the PSA unit. The adsorption step is run at a pressure of about 250 psig to about 700 psig. The pressure during the co-purge step is in the range of about 300 psig to about 800 psig, and the $CO_2$ co-purge stream is preferably introduced at a pressure higher than the pressure during the adsorption step.

The use of a second high-pressure feed stream (the $CO_2$ co-purge stream) increases the cost and complexity of the process in U.S. Pat. No. 8,241,400. The necessity of having a segmented adsorber (or two separate vessels) with an isolation valve between the two and an intermediate side-draw further increases the cost and complexity of the process.

There is also increasing interest in utilizing sources other than petroleum crude oil for producing fuels as the demand for fuels such as aviation fuel increases worldwide. One source is what has been termed bio-renewable feedstocks. These bio-renewable feedstocks include, but are not limited to, plant oils such as corn, jatropha, camelina, rapeseed, canola, soybean and algal oils, animal fats such as tallow, fish oils, and various waste streams such as yellow and brown greases and sewage sludge. The common feature of these feedstocks is that they are composed of mono- di- and tri-glycerides, free fatty acids (FFA). Another class of compounds appropriate for these processes is fatty acid alkyl esters (FAAE), such as fatty acid methyl ester (FAME) or fatty acid ethyl ester (FAEE). These types of compounds contain aliphatic carbon chains generally having from about 8 to about 24 carbon atoms. The aliphatic carbon chains in the glycerides, FFAs, or FAAEs can be saturated or mono-, di- or poly-unsaturated. Most of the glycerides in the bio-renewable feed stocks will be triglycerides, but some of the glycerides in the bio-renewable feedstock may be monoglycerides or diglycerides. The monoglycerides and diglycerides can be processed along with the triglycerides.

There are reports disclosing the production of hydrocarbons from bio-based oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Therefore, there is a need for improved hydrogen production processes with increased hydrogen production and $CO_2$ recovery.

DETAILED DESCRIPTION

Figure 1:
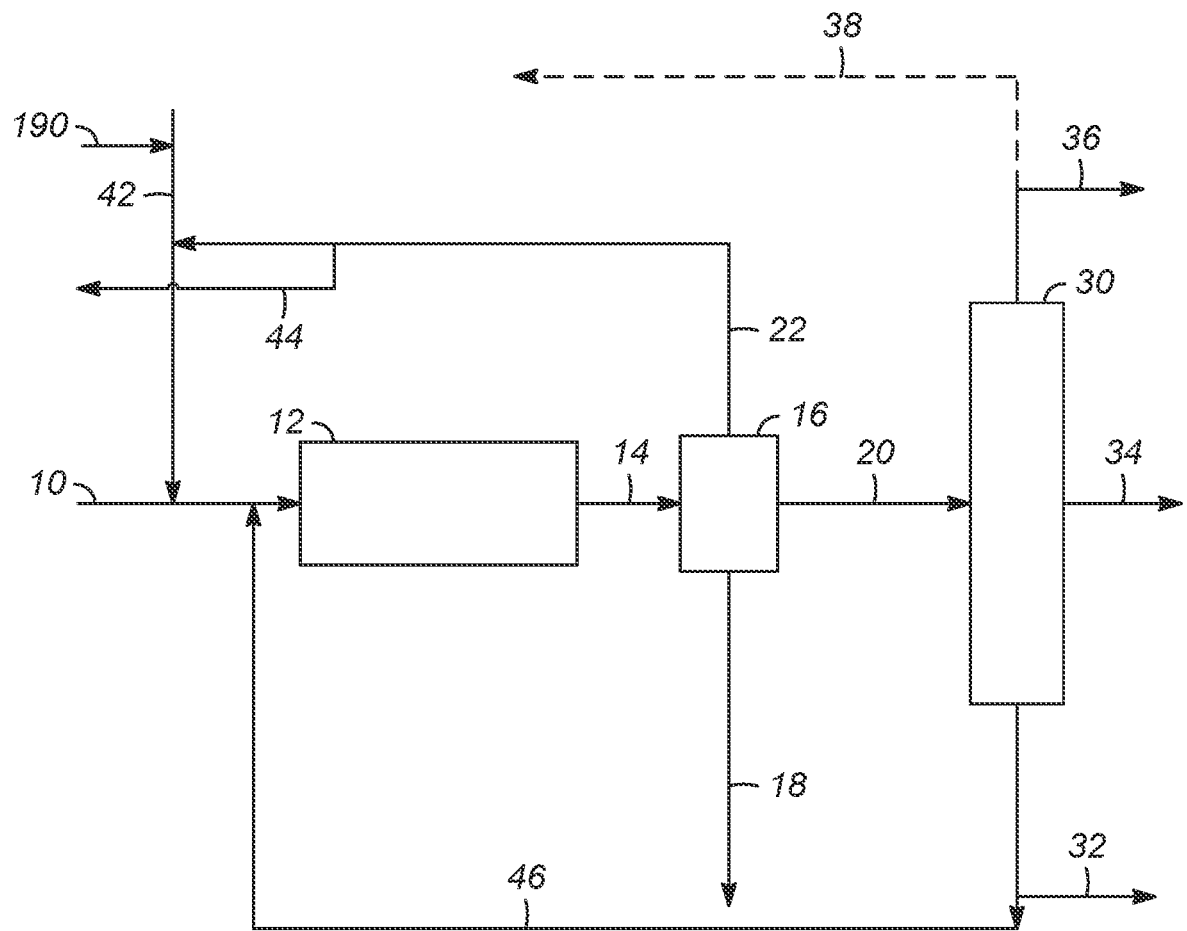
FIG. 1 is a general flow scheme of one embodiment of a process for making bio-renewable fuel.

A bio-renewable conversion process for making fuel from bio-renewable feedstocks is combined with a hydrogen production process for making hydrogen having increased hydrogen production and allowing recovery of $CO_2$.

The bio-renewable conversion process produces hydrocarbon products, such as diesel, aviation fuel, and naphtha, from bio-renewable feedstock. It also produces a purge gas stream comprising hydrogen which is processed in the hydrogen production process. The integrated process provides an economic benefit, reduces net $CO_2$ emissions, and, in some cases, avoids contamination of the $CO_2$ liquid product with hydrocarbons.

The purge gas stream comprising hydrogen from the bio-renewable conversion process, which is currently burned, comprises hydrogen, $CO_2$, optionally water, and at least one of methane, ethane, propane, C4+ hydrocarbons, and carbon monoxide. All or a portion of the purge gas stream comprising hydrogen is sent to one or more process units in the hydrogen production process. The purge gas stream comprising hydrogen can be sent directly or indirectly to the process unit. In the indirect process, it can be sent first to another process unit, including, but not limited to a membrane separation unit, before being sent to the process unit.

The purge gas stream typically comprises at least 50 mol % hydrogen, or at least 55 mol %, or at least 60 mol % hydrogen, or at least 65 mol %, or at least 70 mol %, or at least 75 mol %, or at least 80 mol %, or at least 85 mol %, or at least 90 mol %.

The purge gas stream can be a slip stream from the overhead from a separator downstream of the reaction zone in the bio-renewable conversion process.

One option is to combust the purge gas stream comprising hydrogen in a furnace in a steam reforming process unit.

Another option involves the use of a pressure swing adsorption (PSA) system that produces at least two product streams comprising two PSA units, as will be described in more detail below. The purge gas stream comprising hydrogen is introduced into the second PSA unit for recovery of the hydrogen in the purge gas stream comprising hydrogen. This increases the overall hydrogen recovery in the integrated process.

Yet another option is to separate the purge gas stream comprising hydrogen in a membrane separation unit into a permeate stream comprising hydrogen and carbon dioxide, and a residue stream comprising at least one of methane, ethane, propane, C4+ hydrocarbons, and carbon monoxide. The permeate stream can be sent to the compressor and $CO_2$ recovery system for recovery of the hydrogen and carbon dioxide. About 90% of the hydrogen in the membrane feed stream will be recovered in the permeate stream and about 50% of the $CO_2$ in the membrane feed stream will be recovered in the permeate stream. There are several possible treatments for the residue stream depending on the particular hydrogen production process unit. When the hydrogen production process is a steam reforming process, the residue stream can be combusted in a furnace or fired heater in the steam reforming process unit. Alternatively, the residue stream can be mixed with the feed stream comprising hydrocarbons and sent to the steam reforming process unit as part of the feed. When the process unit comprises an autothermal reforming unit with an optional gas heated reformer, a gasification unit, or a partial oxidation unit, the residue stream can be mixed with the feed stream comprising hydrocarbons, and the mixed stream can be partially oxidized in the autothermal reforming unit with the optional gas heated reformer, the gasification unit, or the partial oxidation unit. Another possibility is to pass the residue stream to the bio-renewable conversion process, and recover at least one of the propane and the C4+ hydrocarbons from the residue stream. Alternatively, the residue stream can be mixed with the feed stream comprising hydrocarbons and sent to the hydrogen production process unit, and the permeate stream can be combusted in a furnace or fired heater.

Still another option is to send the purge gas stream comprising hydrogen to the $CO_2$ recovery system. Although this option increases hydrogen production, the hydrocarbons present in the hydrogen rich purge stream will contaminate the $CO_2$ product stream. Although the hydrocarbon contamination of the $CO_2$ product stream is undesirable in many cases, there may be situations in which it could be acceptable. As part of the integrated process, at least a portion of the feed stream comprising hydrocarbons for the hydrogen production process may come from the bio-renewable conversion process.

One aspect of the invention is a method of producing a hydrogen-enriched product and recovering $CO_2$ in an integrated hydrogen production process and bio-renewable conversion process. In one embodiment, the integrated process comprises: processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon; separating an effluent stream from the steam reforming process unit in a first pressure swing adsorption (PSA) system that produces at least two product streams into at least a first high-pressure hydrogen stream enriched in hydrogen and a hydrogen depleted tail gas stream; compressing the hydrogen depleted tail gas stream in a compressor to form a compressed tail gas stream; separating the compressed tail gas stream in a $CO_2$ recovery system producing a $CO_2$ product and second gas stream comprising hydrogen; hydrogenating, deoxygenating, isomerizing, and selectively hydrocracking a bio-renewable feedstock in a reaction zone in the presence of hydrogen at reaction conditions by contacting the bio-renewable feedstock with a multifunctional catalyst or a set of catalysts having hydrogenation, deoxygenation, isomerization, and selective hydrocracking functions to provide a reaction effluent comprising paraffinic hydrocarbons, hydrogen, $CO_2$, water, and at least one of methane, ethane, propane, C4+ hydrocarbons, and carbon monoxide; separating the reaction effluent in a separator into at least a hydrocarbon stream comprising the paraffinic hydrocarbons and an overhead stream comprising hydrogen, $CO_2$, optionally water, and at least one of methane, ethane, propane, C4+ hydrocarbons, and carbon monoxide; separating the hydrocarbon stream in a fractionation zone to generate a hydrocarbon product stream, wherein the hydrocarbon product stream comprises at least one of a diesel stream comprising hydrocarbons having boiling points in a diesel boiling point range, an aviation fuel stream having hydrocarbons having boiling points in an aviation fuel boiling point range, and a naphtha stream having hydrocarbons in a naphtha boiling point range; recovering the hydrocarbon product stream; separating the overhead stream from the separator into at least a hydrogen rich stream comprising hydrogen; and introducing at least a portion of a purge gas stream comprising hydrogen from the hydrogen rich stream from the bio-renewable conversion process into a process unit in the hydrogen production process.

In some embodiments, the first PSA system that produces at least two product streams comprises a first PSA unit with two product streams, and wherein the first PSA unit separates the effluent stream into the first high-pressure hydrogen stream enriched in hydrogen and the hydrogen depleted tail gas stream; and separating the compressed tail gas stream comprises: separating the compressed tail gas stream in the $CO_2$ recovery system into a bottoms stream comprising a purified liquid $CO_2$ product and an overhead stream comprising the portion of the hydrogen, a portion of the carbon dioxide, and at least a portion of the at least one of the methane, the carbon monoxide, the nitrogen, and the argon; separating the overhead stream from the $CO_2$ recovery system in a second PSA system that produces at least two product streams into at least a second high-pressure hydrogen stream enriched in hydrogen, and a low-pressure $CO_2$ stream enriched in carbon dioxide; recovering the second high-pressure hydrogen stream; and recycling the low-pressure $CO_2$ stream to the compressor.

Suitable bio-renewable conversion processes for the production of aviation and diesel fuel, reaction conditions, and catalysts are known in the art, including, but not limited to, U.S. Pat. Nos. 7,999,142, 8,039,682, 8,198,492, 8,742,183, and 8,865,953, each of which is incorporated herein by reference in its entirety.

In general, the bio-renewable conversion process comprises a reaction zone to hydrogenate, deoxygenate, isomerize and selectively hydrocrack a bio-renewable feedstock in order to generate a hydrocarbon product having paraffins with boiling points in the aviation fuel range. The reaction zone can include one or more reactor vessels, and each reactor vessel may include one or more catalyst beds for the various reactions. Diesel fuel and/or naphtha can also be produced. The hydrocarbon product is useful as an aviation fuel or an aviation fuel blending component. Simply deoxygenating the bio-renewable feedstock in a hydrogen environment in the presence of a hydrotreating catalyst results in straight chain paraffins having chain-lengths similar to, or slightly shorter than, the fatty acid composition of the feedstock. With many feedstocks, this approach may result in a product having an appropriate carbon chain length for a diesel fuel, but not provide a product meeting the specifications for an aviation fuel. The selective hydrocracking reaction reduces the carbon chain length to maximize the selectivity to aviation fuel range paraffins while minimizing lower molecular weight products. Isomerization allows for aviation fuel specifications, such as freeze point, to be met.

The reaction effluent comprises paraffinic hydrocarbons, hydrogen, $CO_2$, water, and at least one of methane, ethane, propane, C4+ hydrocarbons, and carbon monoxide. The reaction effluent is separated into a hydrocarbon stream comprising the paraffinic hydrocarbons and an overhead stream comprising hydrogen, $CO_2$, optionally water, and at least one of methane, ethane, propane, C4+ hydrocarbons, and carbon monoxide. Other streams may also be formed.

The hydrocarbon stream is then separated to form various hydrocarbon product streams, such as a diesel stream comprising hydrocarbons having boiling points in a diesel boiling point range, an aviation fuel stream having hydrocarbons having boiling points in an aviation fuel boiling point range, and a naphtha stream having hydrocarbons in a naphtha boiling point range. The naphtha stream may also contain liquefied petroleum gas (LPG), and/or offgas. Alternatively, the LPG and/or the offgas could be separate streams. At least a portion of the naphtha stream and/or LPG stream and/or offgas stream can be sent to the hydrogen production process and used as part of the hydrocarbon feed to the hydrogen production process or as fuel for a furnace in the hydrogen production process unit.

The hydrogen production process produces hydrogen and allows recovery of $CO_2$ from the effluent stream of a hydrogen production process unit. It uses a PSA system that produces at least two product streams to recover pure hydrogen from the tail gas stream from a hydrogen separation unit in a hydrogen production process. The process utilizes a $CO_2$ recovery system integrated with the PSA system that produces at least two product streams to recover additional hydrogen and high-purity liquid $CO_2$.

In some embodiments, extracting pure hydrogen directly from the overhead stream of the $CO_2$ recovery system with the PSA system that produces at least two product streams provides an economic advantage over systems that use recycle configurations. The additional hydrogen production substantially improves the process economics. Using a PSA system that produces at least two product streams on the $CO_2$ recovery system overhead stream also avoids non-permeate losses of $CO_2$ which occur with the use of a membrane separation process. Utilizing a PSA system that produces at least two product streams offers innovation and flexibility, reducing downstream equipment size and utilities, and increasing $CO_2$ captured (since the impurity-rich purge stream contains no significant $CO_2$).

The hydrogen production process unit may comprise a steam reforming unit with an optional gas heated reformer, an autothermal reforming unit with an optional gas heated reformer, a gasification unit, or a partial oxidation (POX) unit. The hydrogen production process produces an effluent which comprises a mixture of gases comprising hydrogen, carbon dioxide, water, and at least one of methane, carbon monoxide, nitrogen, and argon.

Suitable feed streams comprising hydrocarbons for the hydrogen production processes include, but are not limited to, natural gas, naphtha, liquefied petroleum gas (LPG) for steam reforming, ATR/GHR, and POX processes. The POX and gasification processes could use solid feedstock including, but not limited to, coal and petroleum coke. Other feed streams comprising hydrogen, such as hydrothermal liquefaction (HTL) (which comprises hydrocarbons, water, and oxygen containing molecules), bio-oil and bio-crude (including those derived from HTL), and bio-gas can also be used.

In some embodiments, the first PSA system that produces at least two streams is a hydrogen pressure swing adsorption (PSA) unit. The effluent stream is initially sent to the hydrogen PSA unit for separation into a high-pressure hydrogen stream enriched in hydrogen and a hydrogen depleted tail gas stream comprising the remaining hydrogen, carbon dioxide, water, and at least a portion of the at least one of the methane, carbon monoxide, nitrogen, and argon. The high-pressure hydrogen stream contains about 90% of the hydrogen in the effluent, which is recovered.

The hydrogen depleted tail gas stream is compressed and sent to a $CO_2$ recovery system where it is separated into a liquid $CO_2$ product and an overhead stream comprising the hydrogen, and some carbon dioxide, and some of the at least one of the methane, carbon monoxide, nitrogen, and argon.

The overhead stream is sent to a second PSA system that produces at least two product streams. The second PSA system with at least two product streams separates the overhead stream into at least two streams: a high-pressure hydrogen stream, and a low-pressure $CO_2$ stream. In some embodiments, the high-pressure hydrogen stream is enriched in hydrogen and substantially free of carbon dioxide, methane, carbon monoxide, nitrogen, and argon. The low-pressure $CO_2$ stream is enriched in carbon dioxide and comprises substantially all of the carbon dioxide in the overhead stream. The second high-pressure hydrogen stream is recovered, and the low-pressure $CO_2$ stream is recycled to the compressor. In some embodiments, a second gas stream comprising at least a portion of the at least one of the methane, carbon monoxide, nitrogen, and argon is also formed.

In other embodiments, the first PSA system that produces at least two product streams is a three-product PSA unit, a PSA unit with two product streams, or two PSA units each with two product streams. The first PSA system that produces at least two product streams separates the effluent stream into at least two streams: a high-pressure hydrogen enriched stream, and a low-pressure $CO_2$ enriched stream. In some embodiments, the high-pressure hydrogen stream is enriched in hydrogen and is substantially free of carbon dioxide. In some embodiments, the low-pressure $CO_2$ stream is enriched in carbon dioxide and comprises substantially all of the carbon dioxide in the effluent stream. The high-pressure hydrogen stream is recovered, and the low-pressure $CO_2$ stream is sent to a compressor. The compressed $CO_2$ stream is separated in the $CO_2$ recovery system into a liquid $CO_2$ product and an overhead stream comprising the hydrogen, and some carbon dioxide, and some of the at least one of the methane, carbon monoxide, nitrogen, and argon. The overhead stream is recycled to the first PSA system. In some embodiments, a second gas stream comprising at least a portion of the at least one of the methane, carbon monoxide, nitrogen, and argon is also formed.

The process allows recovery of about 80 to about 90% of the hydrogen in the tail gas stream from the hydrogen PSA unit, as well as capture of substantially all (e.g., about 95% to about 100%) of the $CO_2$.

In some embodiments, the effluent from the hydrogen production process unit that is fed to the hydrogen PSA system is typically in the range of about 20° C. to about 60° C., or about 30° C. to about 50° C., or about 40° C. (or any combination of temperature ranges). The pressure is typically in the range of about 2,000 to about 5,000 kPa.

The effluent is separated in a hydrogen PSA unit into a high-pressure hydrogen steam and a tail gas stream. The high-pressure hydrogen stream contains about 80% to about 90% of the hydrogen in the effluent. The high-pressure hydrogen stream is typically at a pressure in the range of about 2,000 to about 5,000 kPa. The high-pressure hydrogen stream is a high purity stream (e.g. greater than 99%, or greater than 99.9%, or greater than 99.99%, or greater than 99.999%).

The tail gas stream from the hydrogen PSA unit, which contains about 10% to about 20% of the hydrogen in the effluent stream, carbon dioxide, water, and at least a portion of the at least one of the methane, carbon monoxide, nitrogen, and argon, is at a pressure in the range of about 100 to about 200 kPa.

The tail gas stream is compressed to a pressure in the range of about 3,000 to about 6,000 kPa and sent to a $CO_2$ recovery system. The compressed tail gas stream is dried and cooled to a temperature of about −20° C. to about −50° C. It is separated into a $CO_2$-enriched stream and an overhead stream containing the hydrogen, some of the carbon dioxide, and some of the at least one of the methane, carbon monoxide, the nitrogen, and the argon. In some embodiments, the $CO_2$-enriched stream comprises substantially all (e.g., about 95% to about 100%) of the $CO_2$ in the tail gas stream from the hydrogen PSA unit, and is substantially free of methane, carbon monoxide, nitrogen, and argon. In some embodiments, the bottoms stream comprises about 95.0 mol % $CO_2$ or more, about 98.0 mol % $CO_2$ or more, or about 98.5 mol % $CO_2$ or more, or about 99.0 mol % $CO_2$ or more, or about 99.5 mol % $CO_2$ or more, or about 99.9 mol % $CO_2$ or more.

The $CO_2$ recovery system may include a distillation column, with the $CO_2$-enriched product stream being recovered from the bottom of the column and the lighter components (hydrogen, methane, nitrogen, etc.) being recovered from the top of the column. The $CO_2$ recovery system may instead or also include a single or multiple successive flash vapor-liquid separation vessels with each separator providing an additional theoretical stage of mass transfer, with the $CO_2$-enriched product being recovered in the liquid stream(s) and the lighter components (hydrogen, methane, nitrogen, etc.) being recovered in the overhead vapor stream(s).

The $CO_2$-enriched stream is recovered. The $CO_2$-enriched stream may be a liquid stream. In some cases, the liquid stream may then be vaporized for use, if desired.

The overhead stream is sent to the PSA system that produces at least two product streams. The PSA system that produces at least two product streams may be a three-product PSA unit, a PSA unit with two product streams or two PSA units each with two product streams with the product from the first PSA unit feeding into the second PSA unit.

The three-product PSA unit comprises four or more PSA adsorption vessels. There are generally at least six vessels, and typically eight to fourteen vessels. The vessels comprise one or more adsorbent layers, generally one to five, and typically two to three. The percentage of the bed for an adsorption layer is typically between 10% and 100%. Different layers of adsorbent have different selectivity to the components in the overhead stream, as is known to those skilled in the art. Some layers contain adsorbent that is for selective adsorption of $CO_2$ relative to methane, carbon monoxide, nitrogen, argon, and hydrogen, including, but not limited to, layers of activated alumina, silica gel, and sodium Y zeolite. Other layers contain adsorbent that is for selective adsorption of $CO_2$, methane, carbon monoxide, nitrogen, and argon relative to hydrogen, including, but not limited to, layers of activated carbon, silica gel, and molecular sieve zeolite (e.g., 5A or sodium×zeolite). Those of skill in the art will appreciate that other zeolites could be used and will know how to select appropriate adsorbents.

There is a first opening at one end of the vessel, and a second opening at the opposite end. For convenience, the ends will be referred to as the top and the bottom of the vessel. The first opening at the bottom is selectively connected to a high-pressure feed gas inlet line, and a low-pressure tail gas outlet line. The second opening at the top of the vessel is selectively connected to a high-pressure product outlet line, an intermediate pressure vent gas outlet line, and a low-pressure purge gas inlet line.

The feed gas enters at high pressure through the first opening at the bottom of the vessel, and a high-pressure, co-current adsorption and product removal step takes place with the product exiting the vessel at high pressure through the second opening at the top of the vessel. There is at least one co-current depressurization step, and then an intermediate pressure co-current depressurization and vent gas removal step. The second stream is removed through the opening at the top of the vessel at a second pressure. There is a counter-current blowdown step and a counter-current purge step. The purge gas enters through the opening at the top of the vessel at low pressure. The $CO_2$ can be removed at low pressure through the opening at the bottom of the vessel during either or both of the counter-current blowdown step and the counter-current purge step. There is at least one counter-current re-pressurization step following the counter-current purge and tail gas removal step.

The PSA system that produces at least two product streams may comprise two PSA units in series. The overhead stream from the $CO_2$ recovery system is introduced into the first PSA unit where it is separated into a low-pressure tail gas stream enriched in $CO_2$ and a high-pressure stream comprising substantially all of the hydrogen (e.g., about 85% to about 95%), and a portion of the at least one of the methane, carbon monoxide, nitrogen, and argon in the overhead stream. The high-pressure stream is fed to the second PSA unit where it is separated into a high-pressure hydrogen stream enriched in hydrogen and a low-pressure stream containing substantially all of the methane, carbon monoxide, nitrogen, and argon (e.g., about 95% to about 100%).

The PSA system that produces at least two product streams of the present invention provides several advantages. The second stream is not removed at high pressure. With a three-product PSA unit, it is removed at an intermediate pressure between the high pressure at which the hydrogen is removed and the low pressure at which the $CO_2$ is removed, but much closer to the low pressure than to the high pressure. The intermediate pressure is typically less than about 450 kPa. When the PSA system that produces at least two product streams comprises the two PSA units, the second stream is removed at low pressure, typically less than 250 kPa.

In addition, no high-pressure co-purge stream is used. Furthermore, the vessel is not segmented; the second stream is withdrawn through the opening in the top of the vessel. Therefore, there is no need for an isolation valve and a side draw outlet between two adsorbent beds. These factors make the three-product PSA unit much less complex and less expensive to build and operate than the PSA and process of U.S. Pat. No. 8,241,400.

The temperature of the overhead stream entering the second PSA system that produces at least two product streams (after chilling recovery and heat exchange) is typically in the range of about 20° C. to about 60° C., or about 30° C. to about 50° C., or about 40° C. (or any combination of temperature ranges).

The hydrogen concentration in the overhead stream fed to the second PSA system that produces at least two product streams is generally in the range of about 20 mol % to about 60 mol %. For example, the hydrogen concentration in a $CO_2$ distillation column overhead gas within a $CO_2$ recovery system on a steam methane reforming plant tail gas is about 30 mol % to about 50 mol %.

About 80% to 90% of the hydrogen in the overhead stream is typically recovered in the high-pressure hydrogen stream, and the high-pressure hydrogen stream is substantially free of $CO_2$, methane, carbon monoxide, nitrogen, and argon. It typically contains less than about 1% of the $CO_2$ relative to the overhead stream, or less than about 0.1%, or less than about 0.01%. It typically contains less than about 10% of the methane, carbon monoxide, nitrogen, and argon relative to the overhead stream, or less than about 5%, or less than about 2%, or less than about 1%, or less than about 0.1%. The high-pressure hydrogen stream is typically removed at a high pressure in the range of about 1,000 to about 6,000 kPa, or about 2,000 kPa to about 5,000 kPa, or about 2,500 kPa to about 4,500 kPa.

The low-pressure tail gas stream is typically removed at a low pressure in the range of about 50 kPa to about 250 kPa, or about 100 kPa to about 200 kPa.

The low-pressure $CO_2$ stream typically contains substantially all of the $CO_2$ (e.g., about 95% to 100%) in the overhead stream. It typically contains about 10% of the hydrogen relative to the overhead stream (e.g., about 5% to about 15%), and about 40% of the methane, carbon monoxide, nitrogen, and argon relative to the overhead stream (e.g., about 20% to about 60%).

When the second PSA system that produces at least two product streams comprises a three-product PSA unit, the second gas stream is removed at an intermediate pressure between the high pressure and the low pressure, the intermediate pressure is much closer to the low pressure than the high pressure, typically within about 400 kPa of the low pressure, or 300 kPa, or 200 kPa. Typically, the intermediate pressure product stream is removed at a pressure in the range of about 150 kPa to about 450 kPa, or about 250 kPa to about 350 kPa. Although there is some overlap between the intermediate pressure range and the low pressure range, it is understood that in a particular case, the low pressure will be lower than the intermediate pressure.

The second stream typically contains about 40% to 80% of the methane, carbon monoxide, nitrogen, and argon in the overhead stream. It typically contains about 10% of the hydrogen relative to the overhead stream (e.g., about 5% to about 25%), and less than about 5% of the $CO_2$ relative to the overhead stream, or less than about 1%, or less than about 0.1%.

All or a portion of the second stream can be recycled to the hydrogen production process unit, to a water gas shift process unit, and/or to a combustion unit.

When the second PSA system that produces at least two product streams comprises two PSA units in series, the overhead stream is introduced into the first PSA unit where it is separated into the low-pressure $CO_2$ stream containing substantially all of the $CO_2$ (about 95% to 100%) and a high-pressure stream comprising substantially all (e.g. more than 75%, or about 85% to about 95%) of the hydrogen, and a portion (about 50% to about 90%) of the at least one of the methane, the carbon monoxide, the nitrogen, and the argon in the overhead stream. The low-pressure $CO_2$ stream has a low pressure of about 50 kPa to about 250 kPa, or about 100 kPa to about 200 kPa. The high-pressure stream has a high pressure in the range of about 1,000 to about 6,000 kPa, or about 2,000 kPa to about 5,000 kPa, or about 2,500 kPa to about 4,500 kPa.

The first PSA unit contains adsorbent that is for selective adsorption of $CO_2$ relative to methane, carbon monoxide, nitrogen, argon, and hydrogen, including, but not limited to, layers of activated alumina, silica gel, and sodium Y zeolite. The second PSA unit contains adsorbent that is for selective adsorption of $CO_2$, methane, carbon monoxide, nitrogen, and argon relative to hydrogen, including, but not limited to, layers of activated carbon, silica gel, and molecular sieve zeolite (e.g., 5A or sodium×zeolite). Those of skill in the art will appreciate that other zeolites could be used and will know how to select appropriate adsorbents for the first and second PSA units.

The high-pressure stream is fed into the second PSA unit where it is separated into the high-pressure hydrogen stream containing substantially all of the hydrogen (e.g., about 80% to about 90%) and the second gas stream. The second gas stream comprises substantially all of the at least the portion of the at least one of the methane, carbon monoxide, nitrogen, and argon (e.g., about 95% to about 100%) The high-pressure hydrogen stream typically has a high pressure in the range of about 1,000 to about 6,000 kPa, or about 2,000 kPa to about 5,000 kPa, or about 2,500 kPa to about 4,500 kPa. In this arrangement, the second stream has a pressure in the range of about 50 kPa to about 250 kPa, or about 100 kPa to about 200 kPa.

When the PSA system that produces at least two product streams comprises a three-product PSA unit having a three-product PSA cycle, the high-pressure hydrogen stream may be removed during a high-pressure, co-current adsorption step in the three-product PSA cycle, the second gas stream may be removed during a co-current depressurization step in the three-product PSA cycle, and the low-pressure $CO_2$ stream may be removed during a counter-current depressurization step and a counter-current purge step in the three-product PSA cycle.

In some embodiments, when the PSA system that produces at least two product streams is a three-product PSA unit having a three-product PSA cycle, the three-product PSA cycle may comprise:
 a high-pressure, co-current adsorption and hydrogen removal step;
 at least one co-current depressurization step following the high-pressure, co-current adsorption step and hydrogen removal step;
 a co-current depressurization and second gas removal step following the at least one co-current depressurization step;
 a counter-current blowdown step and $CO_2$ removal step following the intermediate pressure co-current depressurization and second gas removal step;
 a counter-current purge and $CO_2$ removal step following the counter-current blowdown step;
 at least one counter-current re-pressurization step following the counter-current purge and $CO_2$ removal step; and optionally a co-current feed re-pressurization step following the at least one counter-current re-pressurization step or a counter-current product re-pressurization following the at least one counter-current re-pressurization step.

In some embodiments, the $CO_2$ recovery system comprises a refrigerated $CO_2$ fractionation process wherein refrigeration cooling is provided by: at least two refrigeration circuits wherein one of the refrigeration circuits utilizes a portion of the liquid $CO_2$ product recovered from a distillation column; or a single closed loop multi-component mixed refrigerant circuit, as described more fully below.

In some embodiments, the process can include a catalytic oxidation (CATOX) reactor on the second stream to recover heat in the form of high-pressure steam from un-converted carbon monoxide and methane from the hydrogen production process and un-recovered hydrogen. Approximately the same amount of heat or steam is produced as when the second stream is sent to a furnace. However, sending it to the CATOX reactor unit avoids the $CO_2$ emissions that would be created from burning these components in a furnace and increases the percentage $CO_2$ captured from the process. The CATOX reactor unit can be approximately isothermal, with catalyst on one side of a heat exchanger and boiling water on the other side. For example, the CATOX reactor unit could have a water/steam (reactor) temperature of about 250° C. The scale of the reactor could be relatively small, e.g., a total gas feed rate (fuel gas+oxygen) of 6,000 $Nm^3$/hr for a hydrogen production plant capacity of 100,000 $Nm^3$/hr.

In some embodiments, there is a selective bypass arrangement to allow the system to operate in the event there is a problem with the compressor, $CO_2$ recovery system, and/or PSA system that produces at least two product streams. In some embodiments, the compressor and the $CO_2$ recovery system are bypassed, and the hydrogen depleted tail gas stream from the hydrogen PSA unit is sent to a furnace in the steam reforming process unit or elsewhere. In other embodiments, the compressor, $CO_2$ recovery system, and/or PSA system that produces at least two product streams are bypassed, and the tail gas stream from the hydrogen PSA unit is sent to a furnace in the hydrogen production process unit or elsewhere. Suitable furnace burners include, but are not limited to, the burners described in U.S. Pat. No. 6,875,008 modified to include an inlet for the tail gas stream, and the burners described in U.S. Application Ser. No. 63/167,343, entitled Active And Passive Combustion Stabilization For Burners For Highly And Rapidly Varying Fuel Gas Compositions, filed on even date herewith, each of which is incorporated by reference in its entirety.

Additional energy recovery can be obtained from the effluent of a WGS unit in the process. The effluent stream from the WGS unit can be heat exchanged with a process stream to form a cooled effluent steam and a pre-heated process stream. Waste heat can be recovered from the cooled effluent stream to generate steam using a process involving a reaction of reversible oligomerization of phosphoric acid. The contact of waste heat with phosphoric acid leads to oligomerization to diphosphoric acid. As a result of the oligomerization, a water molecule splits off and condenses, causing cooling of the waste heat. The pressure is increased on the diphosphoric acid stream. Waste heat then evaporates the water which is absorbed by the diphosphoric acid. This causes de-oligomerization and hydrolysis to occur resulting in conversion back to phosphoric acid and the production of higher value process heat. The pressure is then decreased on the phosphoric acid stream, and the cycle is repeated. The process of waste heat recovery using the reversible oligomerization of phosphoric acid is available from Qpinch of Antwerp, Belgium.

In some embodiments, the method further comprises: passing a least a portion of the naphtha stream to the hydrogen production process, and wherein at least a portion of the feed stream comprising hydrocarbons for the hydrogen production process comprises the at least the portion of the naphtha stream.

In some embodiments, the process unit comprises a steam reforming process unit with an optional gas heated reformer, and wherein the purge gas stream comprising hydrogen is combusted in a furnace or fired heater in the steam reforming process unit with the optional gas heated reformer.

In some embodiments, the process unit comprises the PSA system that produces at least two product streams, and wherein the PSA system that produces at least two product streams comprises two PSA units each with two product streams and wherein separating the overhead stream from the $CO_2$ recovery system comprises; introducing the overhead stream into the first PSA unit and separating the overhead stream into the low-pressure $CO_2$ stream and a high-pressure third stream comprising more than 75% of the hydrogen and a first portion of at least the portion of the at least one of the methane, the carbon monoxide, the nitrogen, and argon; feeding the high-pressure third stream into the second PSA unit, and wherein the second high-pressure hydrogen stream and the second gas stream are removed from the second PSA unit; and wherein the purge gas stream comprising hydrogen from the bio-renewable process is introduced into the second PSA unit.

In some embodiments, the method further comprises: separating the purge gas stream comprising hydrogen in a membrane separation unit into a permeate stream comprising hydrogen and $CO_2$, and a residue stream comprising at least one of methane, ethane, propane, C4+ hydrocarbons and carbon monoxide; wherein the process unit comprises the compressor, and wherein the permeate stream is compressed in the compressor.

In some embodiments, the method further comprises at least one of: wherein a second process unit comprises a steam reforming process unit with an optional gas heated reformer, and further comprising combusting the residue stream in a furnace or fired heater in the steam reforming process unit with the optional gas heated reformer; wherein a second process unit comprises a steam reforming process unit with an optional gas heated reformer, and further comprising mixing the residue stream with the feed stream comprising hydrocarbons in the steam reforming process unit with the optional gas heated reformer; wherein the process unit comprises an autothermal reforming unit with an optional gas heated reformer, a gasification unit, or a partial oxidation unit and further comprising mixing the residue stream with the feed stream comprising hydrocarbons and partially oxidizing the mixed stream in the autothermal reforming unit with the optional gas heated reformer, the gasification unit, or the partial oxidation unit; and passing the residue stream to the bio-renewable hydrocarbon production process, and recovering at least one of the propane and the C4+ hydrocarbons from the residue stream.

In some embodiments, the process unit comprises the $CO_2$ recovery system and wherein the purge gas stream comprising hydrogen from the bio-renewable conversion process is introduced into the $CO_2$ recovery system.

In some embodiments, the PSA system that produces at least two product streams comprises a three-product PSA unit and wherein separating the overhead stream from the $CO_2$ recovery system comprises: introducing the overhead stream into the three-product PSA unit having a PSA cycle; removing the second high-pressure hydrogen stream during a high-pressure, co-current adsorption step in the PSA cycle; removing the second gas stream during a co-current depressurization step in the PSA cycle; and removing the low-pressure $CO_2$ stream during at least one of a counter-current depressurization step and a counter-current purge step in the PSA cycle.

In some embodiments, the $CO_2$ recovery system comprises a refrigerated $CO_2$ fractionation process wherein refrigeration cooling is provided by: at least two refrigeration circuits wherein one of the refrigeration circuits utilizes a portion of the liquid $CO_2$ product recovered from a distillation column in the $CO_2$ recovery system; or a single closed loop multi-component mixed refrigerant system.

In some embodiments, the method further comprises: selectively bypassing the compressor, the $CO_2$ recovery system, and the PSA system that produces at least two product streams and sending the hydrogen depleted tail gas stream from the hydrogen PSA unit to a furnace in the steam reforming process unit.

In some embodiments, the method further comprises: separating the purge gas stream comprising hydrogen from the bio-renewable conversion process in a membrane separation unit into a permeate stream comprising hydrogen and $CO_2$, and a residue stream comprising at least one of methane, ethane, propane, C4+ hydrocarbons, and carbon monoxide; and wherein the process unit comprises the hydrogen production process unit and wherein the residue stream is introduced into the hydrogen production process unit as a portion of the feed stream; and wherein the process unit comprises the hydrogen production process unit and wherein the permeate stream is introduced into a furnace.

Another aspect of the invention is a method of producing a hydrogen-enriched stream and recovering $CO_2$ from a hydrogen production process unit. In one embodiment, the method comprises: processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon; separating an effluent stream from the hydrogen production process unit in a hydrogen pressure swing adsorption (PSA) unit into a first high-pressure hydrogen stream enriched in hydrogen and a hydrogen depleted tail gas stream comprising a portion of the hydrogen, the carbon dioxide, the water, and at least a portion of the at least one of the methane, the carbon monoxide, the nitrogen, and the argon; compressing the hydrogen depleted tail gas stream in a compressor to form a compressed tail gas stream; separating the compressed tail gas stream in a $CO_2$ recovery system producing a $CO_2$-enriched product stream and second gas stream that comprises at least a portion of the at least one of the methane, the carbon monoxide, the nitrogen, and the argon; introducing at least a portion of a purge gas stream comprising hydrogen from a bio-renewable conversion process for making a hydrocarbon product from a bio-renewable feedstock into one of the process units in the method of producing hydrogen and recovering $CO_2$.

In some embodiments, separating the compressed tail gas stream comprises: separating the compressed tail gas stream in the $CO_2$ recovery system into a $CO_2$-enriched product stream and an overhead stream comprising the portion of the hydrogen, a portion of the carbon dioxide, and at least a portion of the at least one of the methane, the carbon monoxide, the nitrogen, and the argon; and separating the overhead stream from the $CO_2$ recovery system in a PSA system that produces at least two product streams into at least a second high-pressure hydrogen stream enriched in hydrogen, and a low-pressure $CO_2$ stream enriched in carbon dioxide; recovering the second high-pressure hydrogen stream; and recycling the low-pressure $CO_2$ stream to the compressor.

In some embodiments, the process unit comprises a steam reforming process unit with an optional gas heated reformer and wherein the purge gas stream comprising hydrogen from the bio-renewable conversion process is combusted in a furnace or fired heater in the steam reforming process unit with the optional gas heated reformer.

In some embodiments, the process unit comprises the second PSA system that produces at least two product streams, and wherein the second PSA system comprises two PSA units with two product streams and wherein separating the overhead stream from the $CO_2$ recovery system comprises; introducing the overhead stream into the first PSA unit and separating the overhead stream into the low-pressure $CO_2$ stream and a third high-pressure stream enriched in hydrogen; feeding the third high-pressure stream into the second PSA unit, and wherein the second high-pressure hydrogen stream and a second gas stream are removed from the second PSA unit; and wherein the purge gas stream comprising hydrogen from the bio-renewable conversion process is introduced into the second PSA unit.

In some embodiments, the method further comprises: separating the purge gas stream comprising hydrogen from the bio-renewable conversion process in a membrane separation unit into a permeate stream comprising hydrogen and $CO_2$, and a residue stream comprising at least one of methane, ethane, propane, C4+ hydrocarbons, and carbon monoxide; and wherein the process unit comprises the compressor, and wherein the permeate stream is compressed in the compressor.

In some embodiments, the method further comprises at least one of: wherein a second process unit comprises a steam reforming process unit with an optional gas heated reformer, and further comprising combusting the residue stream in a furnace or fired heater in the steam reforming process unit with the optional gas heated reformer; wherein a second process unit comprises a steam reforming process unit with an optional gas heated reformer, and further comprising mixing the residue stream with the feed stream comprising hydrocarbons in the steam reforming process unit with the optional gas heated reformer; wherein the process unit comprises an autothermal reforming unit with an optional gas heated reformer, a gasification unit, or a partial oxidation unit and further comprising mixing the residue stream with the feed stream comprising hydrocarbons and partially oxidizing the mixed stream in the autothermal reforming unit with the optional gas heated reformer, the gasification unit, or the partial oxidation unit; and passing the residue stream to the bio-renewable conversion process, and recovering at least one of the propane and the C4+ hydrocarbons from the residue stream.

In some embodiments, the process unit comprises the $CO_2$ recovery system and wherein the purge gas stream comprising hydrogen from the bio-renewable conversion process is introduced into the $CO_2$ recovery system.

In some embodiments, at least a portion of the feed stream comprising hydrocarbons for the hydrogen production process comprises an overhead stream from a product fractionation zone in the bio-renewable conversion process.

In some embodiments, the PSA system that produces at least two product streams comprises a three-product PSA unit and wherein separating the overhead stream from the $CO_2$ recovery system comprises: introducing the overhead stream into the three-product PSA unit having a PSA cycle; removing the second high-pressure hydrogen stream during a high-pressure, co-current adsorption step in the PSA cycle; removing a second gas stream during a co-current depressurization step in the PSA cycle; and removing the low-pressure $CO_2$ stream during at least one of a counter-current depressurization step and a counter-current purge step in the PSA cycle.

In some embodiments, the $CO_2$ recovery system comprises a refrigerated $CO_2$ fractionation process wherein refrigeration cooling is provided by: at least two refrigeration circuits wherein one of the refrigeration circuits utilizes a portion of the liquid $CO_2$ product recovered from the $CO_2$ recovery system; or a single closed loop multi-component mixed refrigerant system.

In some embodiments, the method further comprises: selectively bypassing the compressor, the $CO_2$ recovery system, and the PSA system that produces at least two product streams and sending the hydrogen depleted tail gas stream from the hydrogen PSA unit to a furnace in the steam reforming process unit.

Another aspect of the invention is a method of producing a hydrogen-enriched product and recovering $CO_2$ from a hydrogen production process unit. In one embodiment, the method comprises: processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon; separating an effluent stream comprising the synthesis gas from the hydrogen production process unit into a high purity hydrogen stream, a $CO_2$ stream enriched in carbon dioxide, and optionally a second gas stream comprising at least a portion of the at least one of the methane, the carbon monoxide, the nitrogen, and the argon; recovering the high purity hydrogen stream; and introducing at least a portion of a purge gas stream comprising hydrogen from a bio-renewable conversion process for making a hydrocarbon product from a bio-renewable feedstock into one of the process units in the method of producing hydrogen and recovering $CO_2$.

FIG. 1 illustrates one embodiment of a bio-renewable conversion process. Bio-renewable feedstock 10 enters the reaction zone 12 along with make-up hydrogen stream 42 and optional hydrocarbon recycle 46.

The bio-renewable feedstock 10 originates from plants or animals and includes feedstocks other than those obtained directly from petroleum crude oil. Another term that has been used to describe this class of feedstocks is renewable fats and oils. The renewable feedstocks that can be used in the present invention include any of those which comprise glycerides and free fatty acids (FFA). Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, *cuphea* oil, camelina oil, jatropha oil, curcas oil, babassu oil, palm kernel oil, *crambe* oil, and the like. Biorenewable is another term used to describe these feedstocks. The glycerides, FFAs, and fatty acid alkyl esters, of the typical vegetable oil or animal fat contain aliphatic hydrocarbon chains in their structure which have about 8 to about 24 carbon atoms with a majority of the oils containing high concentrations of fatty acids with 16 and 18 carbon atoms. Mixtures or co-feeds of renewable feedstocks and fossil fuel derived hydrocarbons may also be used as the feedstock. Other feedstock components which may be used, especially as a co-feed component in combination with the above listed feedstocks, include spent motor oil and industrial lubricants, used paraffin waxes, liquids derived from gasification of coal, biomass, or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a fossil fuel based or other process into a valuable co-feed component to the current process.

Contacting the non-petroleum feedstock with the multifunctional catalyst or set of catalysts generates hydrogenated, deoxygenated, selectively cracked and isomerized reaction zone effluent 14. Reaction zone effluent 14 is introduced into separator 16. The separator 16 comprises a cold separator and optionally a hot separator. With a cold separator only, water is removed as a liquid in line 18 (cold separator mode). When a hot separator is present, water may also be removed as a vapor in line 22 (hot separator mode). Hydrogen, $CO_2$, optionally water, and at least one of methane, ethane, propane, C4+ hydrocarbons, and carbon monoxide are separated and removed in line 22.

The overhead in line 22 is a hydrogen-rich gas that is combined with bio-renewable feedstock 10. A small purge gas stream comprising hydrogen 44 is removed to control recycle gas hydrogen purity.

A liquid stream containing jet fuel and diesel fuel range paraffins and some lighter hydrocarbons is removed from separator 16 in line 20 and conducted to product fractionation zone 30. Product fractionation zone 30 is operated so that product cut 34 contains the hydrocarbons in a boiling range most beneficial to meeting the desired aviation fuel specifications. Product cut 34 is collected for use as aviation fuel or as a blending component of aviation fuel.

The lighter materials such as naphtha and LPG are removed in fractionation zone overhead stream 36. A portion of fractionation zone overhead stream 36 may be conducted in line 38 to the hydrogen production process, as described below. If desired, the naphtha and LPG may be further separated into an LPG stream and a naphtha stream (not shown).

Hydrocarbons that have a boiling point higher than acceptable for the specification of the aviation fuel are removed in bottoms stream 32. A portion of bottoms stream 32 may be recovered and used as fuel such as, for example, low sulfur heating oil fuel, ethylene plant feedstock, feed to lube plant, paraffinic solvent or dielectric oil. It is likely that bottoms stream 32 may be acceptable for use as diesel or a diesel blending component. A portion 46 of bottoms stream 32 is recycled to the reaction zone.

A portion of a hydrocarbon stream may also be cooled down if necessary and used as cool quench liquid between beds of the reaction zone to further control the heat of reaction and provide quench liquid for emergencies. The recycle stream may be introduced to the inlet of the reaction zone and/or to any subsequent beds or reactors. One benefit of the hydrocarbon recycle is to control the temperature rise across the individual beds. However, as discussed above, the amount of hydrocarbon recycle may be determined based upon the desired hydrogen solubility in the reaction zone and to minimize the cracking severity per pass to result in high selectivity to aviation range paraffins. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation.

The aviation fuel product cut 34 generated in the present invention is suitable for, or as a blending component for, uses such as an aviation fuel. Depending upon the application, various additives may be combined with the fuel composition generated in order to meet required specifications for different specific fuels. In particular, the hydrocarbon product stream generated herein complies with, is a blending component for, or may be combined with one or more additives to meet at least one of: ASTM D 1655 Specification for Aviation Turbine Fuels Defense Stan 91-91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type MIL-DTL-83133, JP-8, MW-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel is generally termed "jet fuel" herein and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8, defined by Military Specification ML-DTL-83133, which is a military grade type of highly refined kerosene based jet propellant specified by the United States Government. The fuel produced from glycerides or FAA as described herein is very similar to isoparaffinic kerosene or iPK, also known as a synthetic paraffinic kerosene (SPK) or synthetic jet fuel.

Figure 2:
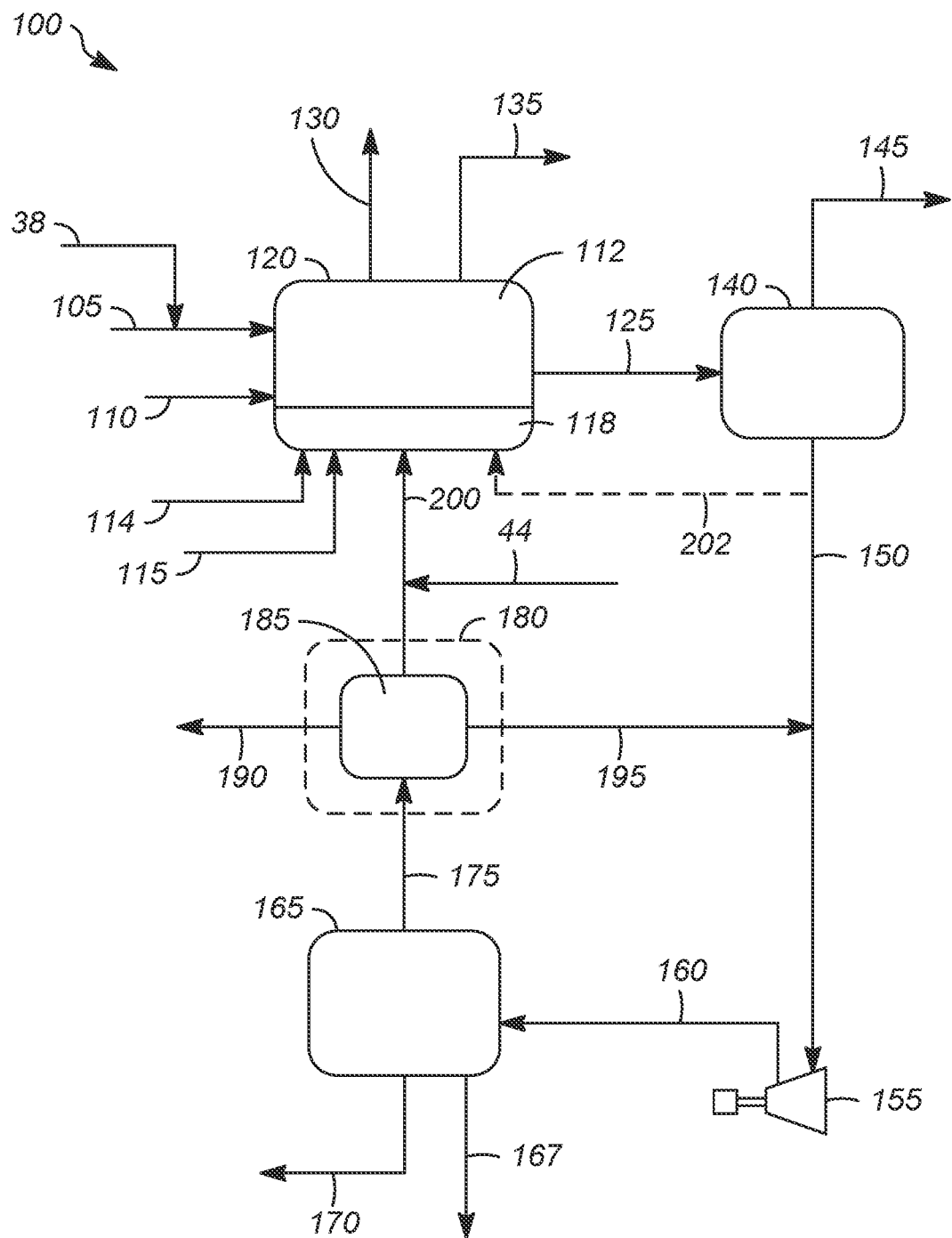
FIG. 2 is an illustration of one embodiment of a method of producing a hydrogen stream and a $CO_2$ stream from an effluent stream of a hydrogen production process unit using a PSA system that produces at least two product streams of the present invention.

FIG. 2 illustrates one embodiment of a hydrogen production process 100 incorporating the three-product PSA unit of the present invention. Natural gas feed 105 and water 110 are sent to the reaction section 112 of the steam reforming process unit 120, and assist fuel gas 114 and air 115 are sent to the steam reforming process unit 120. Other feed streams comprising hydrocarbons could be used instead of natural gas including, but not limited to, naphtha and liquefied petroleum gas (LPG). The assist fuel gas is an extra fuel source to provide stability and enough heat for the reforming reaction because the PSA tail gas or vent gas does not provide enough heat to drive the process. Suitable assist fuel gases include, but are not limited to, natural gas, and other largely hydrocarbon containing fuels, such as refinery fuel gas, petrochemical complex synthesized fuel gas, vaporized naphtha or vaporized liquefied petroleum gas (LPG), or blends of hydrocarbon containing fuels with hydrogen, up to and including crude or purified hydrogen. Other feed streams comprising hydrocarbons that could be used instead of natural gas for steam reforming, ATR/GHR, and POX processes include, but are not limited to, naphtha and liquefied petroleum gas (LPG). The POX and gasification processes could use solid feedstock including, but not limited to, coal and petroleum coke.

The steam reforming and water-gas shift reactions produce an effluent stream 125 comprising hydrogen, $CO_2$, water and at least one of methane, carbon monoxide, and nitrogen. Flue gas stream 130 and steam stream 135 also exit the steam reforming process unit 120.

Effluent stream 125 has a temperature of or about 30° C. to about 50° C. (after heat recovery and cooling in the steam reforming process), and a pressure of about 2,000 to about 3,000 kPa. Effluent stream 125 is sent to the hydrogen PSA unit 140 where it is separated into a high purity hydrogen stream 145 enriched in hydrogen and a hydrogen depleted tail gas stream 150 comprising a portion of the hydrogen, the $CO_2$, the water, and at least a portion of the at least one of the methane, carbon monoxide, and nitrogen.

The tail gas stream 150 is sent to compressor 155 where it is compressed from a pressure in the range of about 110 kPa to about 200 kPa to a pressure in the range of about 3,000 kPa to about 6,000 kPa.

Compressed tail gas stream 160 is sent to a $CO_2$ recovery unit 165 where it is dried to remove water stream 167, cooled to a temperature of about −20° C. to about −50° C., and separated into a bottoms stream 170 and an overhead stream 175. The bottoms stream 170 comprising liquid $CO_2$ is recovered.

The overhead stream 175 is sent to the PSA system that produces at least two product streams 180 comprising a three-product PSA unit 185 where it is separated into three streams. A high-pressure hydrogen stream 190 is recovered. All or a portion of high-pressure hydrogen stream 190 can be sent to the bio-renewable conversion process and combined with the make-up hydrogen stream 42. A low-pressure $CO_2$ stream 195 is recycled to the compressor 155.

Intermediate pressure vent gas stream 200 comprising at least a portion of the at least one of the methane, carbon monoxide, and nitrogen and a small amount of hydrogen (e.g., less than about 20%, or about 10% to about 20%) is sent to the steam reforming process unit 120 as fuel. The purge gas stream comprising hydrogen 44 from the bio-renewable conversion process is mixed with the intermediate pressure vent gas stream 200 and sent to the furnace 118 of the steam reforming process unit 120.

Bypass line 202 sends the tail gas stream 150 to the furnace in the steam reforming process unit for combustion. This allows the steam reforming process unit to continue operating without recovery of $CO_2$ in the event of a problem with the compressor 155, the $CO_2$ recovery unit 165, or the PSA system that produces at least two product streams 180.

Figure 3:
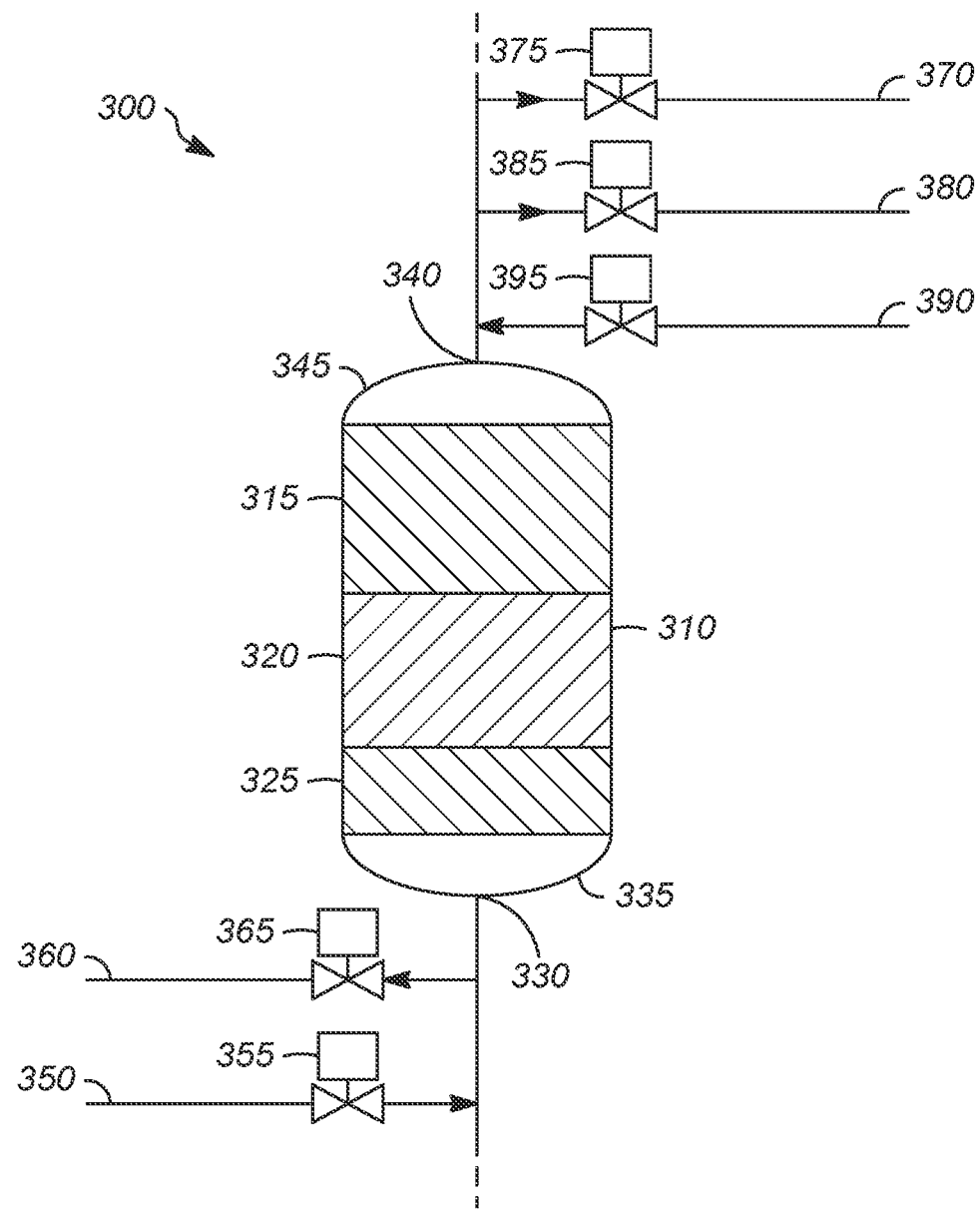
FIG. 3 is an illustration of one embodiment of a three-product PSA unit for use in the PSA system that produces at least two product streams of the present invention.

FIG. 3 illustrates a PSA unit 300 comprising a PSA adsorption vessel 310. The PSA adsorption vessel 310 includes three adsorption layers 315, 320, 325. The PSA adsorption vessel 310 includes a first opening 330 at a first end 335 and a second opening 340 at a second end 345. The first opening 330 is in selective fluid communication with high-pressure feed gas inlet line 350 via valve 355 and with low-pressure tail gas outlet line 360 via valve 365. The second opening 340 is in selective fluid communication with high-pressure product outlet line 370 via valve 375, intermediate pressure vent gas outlet line 380 via valve 385, and low-pressure purge gas inlet line 390 via valve 395.

During the high-pressure, co-current adsorption and product removal step of the PSA cycle, valves 355 and 375 are open, and valves 365, 385, and 395 are closed, allowing the high-pressure feed gas to enter the PSA adsorption vessel 310 and the high-pressure hydrogen stream to exit.

During the at least one co-current depressurization step, valves 355, 365, 375, 385, and 395 are closed.

During the intermediate pressure co-current depressurization and vent removal step, valve 385 is open, and valves 355, 365, 375, and 395 are closed.

During the counter-current blowdown step and tail gas removal step, valve 365 is open, and valves 355, 375, 385, and 395 are closed. The bed de-pressurizes through valve 365, and some of the $CO_2$ is desorbed.

During the counter-current purge and tail gas removal step, valves 365 and 395 are open, and valves 355, 375, and 385 are closed. The purge gas is introduced, and the $CO_2$ is removed.

During the at least one counter-current re-pressurization step, valves 355, 365, 375, 385, and 395 are closed.

Figure 4:
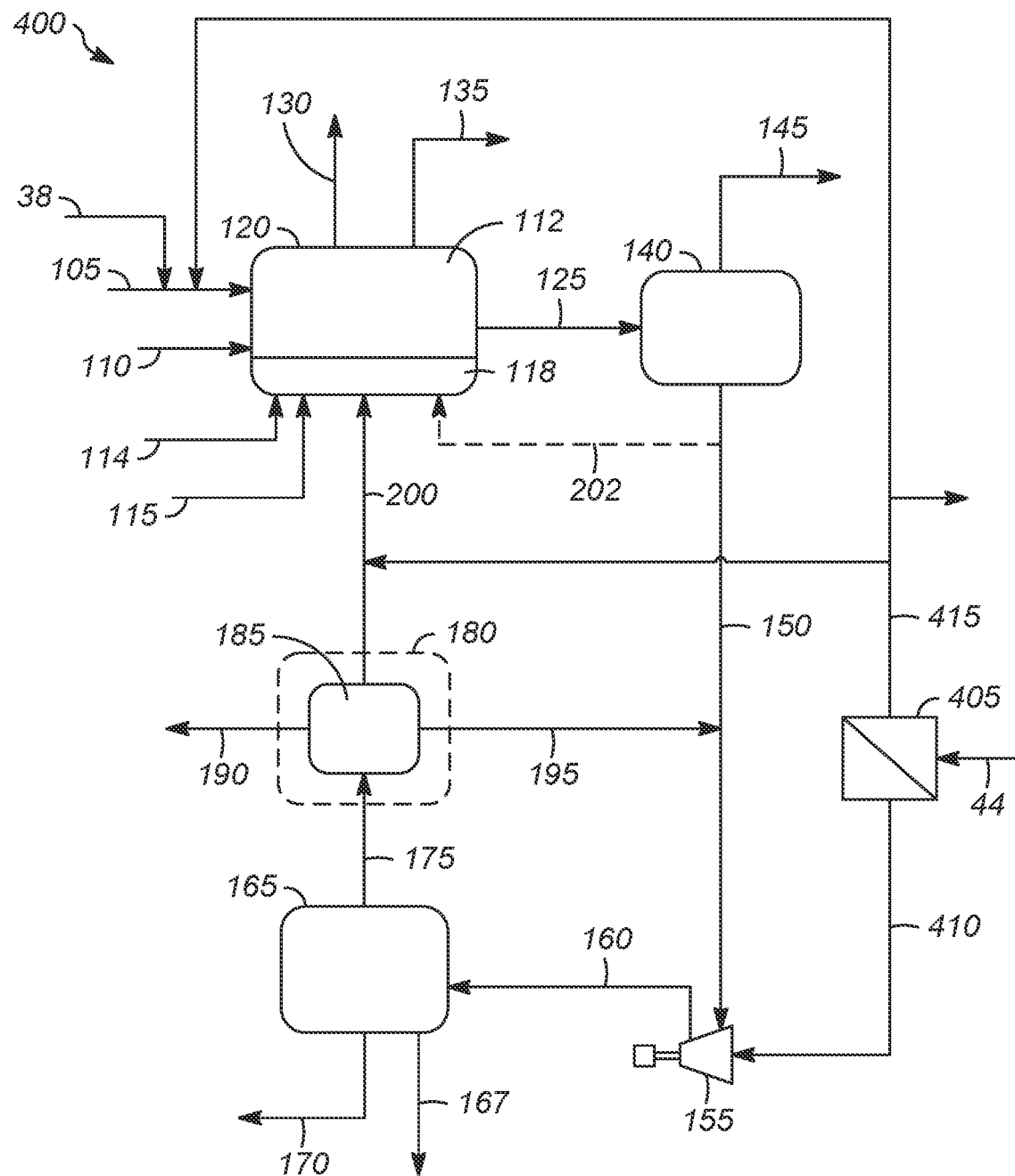
FIG. 4 is an illustration of another embodiment of a method of producing a hydrogen stream and a $CO_2$ stream from an effluent stream of a hydrogen production process unit using the PSA system that produces at least two product streams of the present invention.

FIG. 4 illustrates one embodiment of a hydrogen production process 400 incorporating the three-product PSA unit of the present invention. Natural gas feed 105 and water 110 are sent to the reaction section 112 of the steam reforming process unit 120, and assist fuel gas 114 and air 115 are sent to the furnace 118 in the steam reforming process unit 120. Other feed streams comprising hydrocarbons could be used instead of natural gas, as discussed above. The assist fuel gases are described above.

The steam reforming and water-gas shift reactions produce an effluent stream 125 comprising hydrogen, $CO_2$, water and at least one of methane, carbon monoxide, and nitrogen. Flue gas stream 130 and steam stream 135 also exit the steam reforming process unit 120.

Effluent stream 125 has a temperature of or about 30° C. to about 50° C. (after heat recovery and cooling in the steam reforming process), and a pressure of about 2,000 to about 3,000 kPa. Effluent stream 125 is sent to the hydrogen PSA unit 140 where it is separated into a high purity hydrogen stream 145 enriched in hydrogen and a hydrogen depleted tail gas stream 150 comprising a portion of the hydrogen, the $CO_2$, the water, and at least a portion of the at least one of the methane, carbon monoxide, and nitrogen.

The tail gas stream 150 is sent to compressor 155 where it is compressed from a pressure in the range of about 110 kPa to about 200 kPa to a pressure in the range of about 3,000 kPa to about 6,000 kPa.

Compressed tail gas stream 160 is sent to a $CO_2$ recovery unit 165 where it is dried to remove water stream 167, cooled to a temperature of about −20° C. to about −50° C., and separated into a bottoms stream 170 and an overhead stream 175. The bottoms stream 170 comprising liquid $CO_2$ is recovered.

The overhead stream 175 is sent to the PSA system that produces at least two product streams 180 comprising a three-product PSA unit 185 where it is separated into three streams. A high-pressure hydrogen stream 190 is recovered. All or a portion of high-pressure hydrogen stream 190 can be sent to the bio-renewable conversion process and combined with the make-up hydrogen stream 42. A low-pressure $CO_2$ stream 195 is recycled to the compressor 155.

Intermediate pressure vent gas stream 200 comprising at least a portion of the at least one of the methane, carbon monoxide, and nitrogen and a small amount of hydrogen (e.g., less than about 20%, or about 10% to about 20%) is sent to the steam reforming process unit 120 as fuel.

The purge gas stream comprising hydrogen 44 from the bio-renewable conversion process is sent to a membrane separation unit 405 where it is separated into a permeate stream 410 comprising hydrogen and $CO_2$, and a residue stream 415 comprising at least one of methane, ethane, propane, C4+ hydrocarbons and carbon monoxide. The permeate stream 410 is sent to the compressor 155 and on to the $CO_2$ recovery system 165 and the PSA system that produces at least two product streams 180 to recover the hydrogen and $CO_2$ in the permeate stream 410. In one embodiment, all or a portion of the residue stream 415 is mixed with the intermediate pressure vent gas stream 200 and sent to the furnace 118 of the steam reforming process unit 120. In another embodiment, all or a portion of the residue stream 415 can be mixed with the natural gas feed 105 and sent to the steam reforming process unit 120. When the hydrogen processing unit is an autothermal reforming unit with an optional gas heated reformer, a gasification unit, or a partial oxidation unit, all or a portion of the residue stream 415 can be mixed with the feed stream comprising hydrocarbons and partially oxidized in the autothermal reforming unit, the gasification unit, or the partial oxidation unit. In still another embodiment, all or a portion of the residue stream 415 can be returned to the bio-renewable hydrocarbon production process for recovery of the propane and/or the C4+ hydrocarbons.

Bypass line 202 sends the tail gas stream 150 to the furnace in the steam reforming process unit for combustion. This allows the steam reforming process unit to continue operating without recovery of $CO_2$ in the event of a problem with the compressor 155, the $CO_2$ recovery unit 165, or the PSA system that produces at least two product streams 180.

Figure 5:
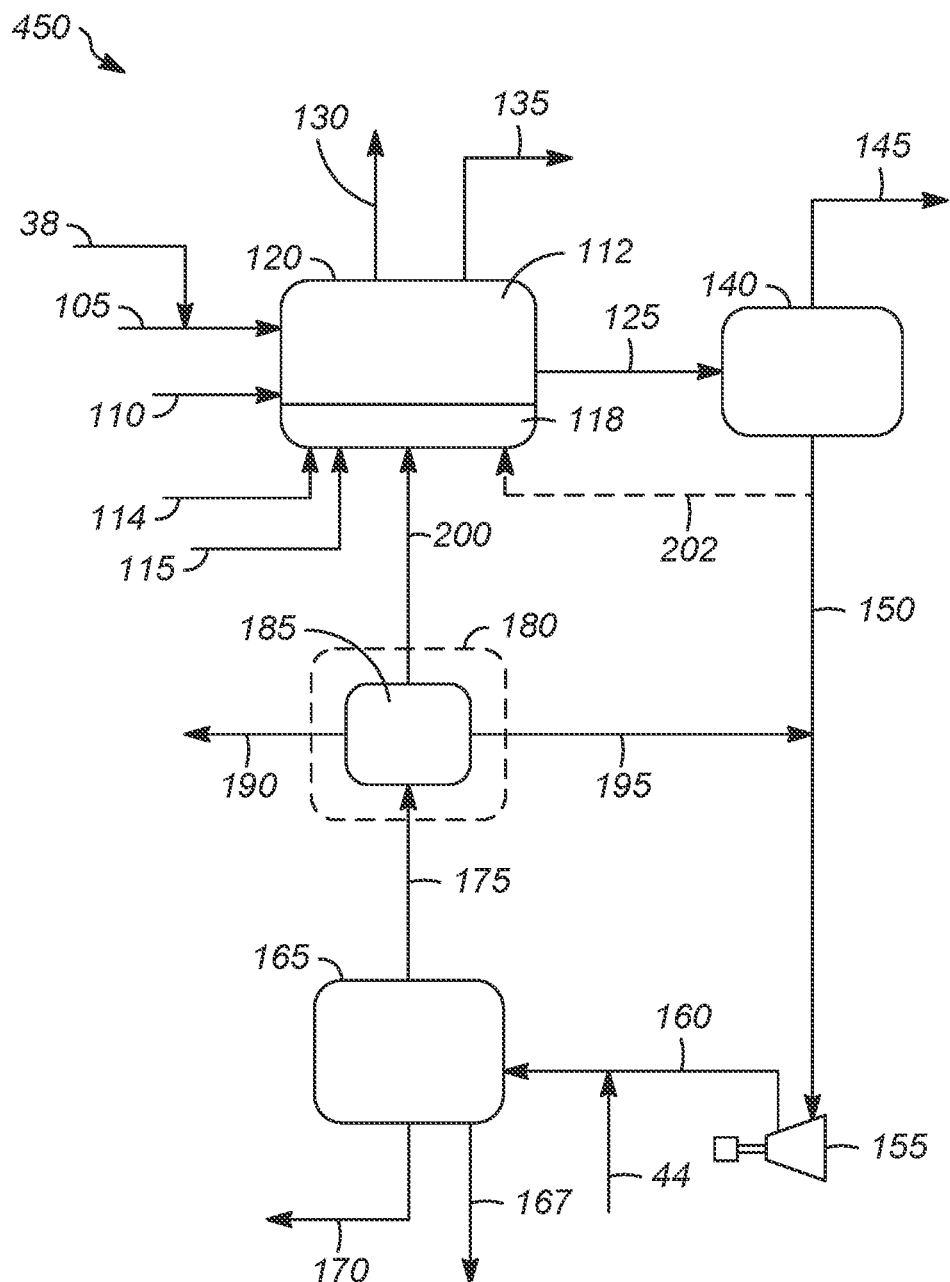
FIG. 5 is an illustration of another embodiment of a method of producing a hydrogen stream and a $CO_2$ stream from an effluent stream of a hydrogen production process unit using the PSA system that produces at least two product streams of the present invention.

FIG. 5 illustrates one embodiment of a hydrogen production process 450 incorporating the three-product PSA unit of the present invention. Natural gas feed 105 and water 110 are sent to the reaction section 112 of the steam reforming process unit 120, and assist fuel gas 114 and air 115 are sent to the furnace 118 in the steam reforming process unit 120. Other feed streams comprising hydrocarbons could be used instead of natural gas, as discussed above. The assist fuel gases are described above.

The steam reforming and water-gas shift reactions produce an effluent stream 125 comprising hydrogen, $CO_2$, water and at least one of methane, carbon monoxide, and nitrogen. Flue gas stream 130 and steam stream 135 also exit the steam reforming process unit 120.

Effluent stream 125 has a temperature of or about 30° C. to about 50° C. (after heat recovery and cooling in the steam reforming process), and a pressure of about 2,000 to about 3,000 kPa. Effluent stream 125 is sent to the hydrogen PSA unit 140 where it is separated into a high purity hydrogen stream 145 enriched in hydrogen and a hydrogen depleted tail gas stream 150 comprising a portion of the hydrogen, the $CO_2$, the water, and at least a portion of the at least one of the methane, carbon monoxide, and nitrogen.

The tail gas stream 150 is sent to compressor 155 where it is compressed from a pressure in the range of about 110 kPa to about 200 kPa to a pressure in the range of about 3,000 kPa to about 6,000 kPa.

The purge gas stream comprising hydrogen 44 from the bio-renewable conversion process is combined with the compressed tail gas stream 160.

The compressed tail gas stream 160 is sent to a $CO_2$ recovery unit 165 where it is dried to remove water stream 167, cooled to a temperature of about −20° C. to about −50° C., and separated into a bottoms stream 170 and an overhead stream 175. The bottoms stream 170 comprising liquid $CO_2$ is recovered.

The overhead stream 175 is sent to the PSA system that produces at least two product streams 180 comprising a three-product PSA unit 185 where it is separated into three streams. A high-pressure hydrogen stream 190 is recovered. All or a portion of high-pressure hydrogen stream 190 can be sent to the bio-renewable conversion process and combined with the make-up hydrogen stream 42. A low-pressure $CO_2$ stream 195 is recycled to the compressor 155.

Intermediate pressure vent gas stream 200 comprising at least a portion of the at least one of the methane, carbon monoxide, and nitrogen and a small amount of hydrogen (e.g., less than about 20%, or about 10% to about 20%) is sent to the steam reforming process unit 120 as fuel.

Bypass line 202 sends the tail gas stream 150 to the furnace in the steam reforming process unit for combustion. This allows the steam reforming process unit to continue operating without recovery of $CO_2$ in the event of a problem with the compressor 155, the $CO_2$ recovery unit 165, or the PSA system that produces at least two product streams 180.

Figure 6:
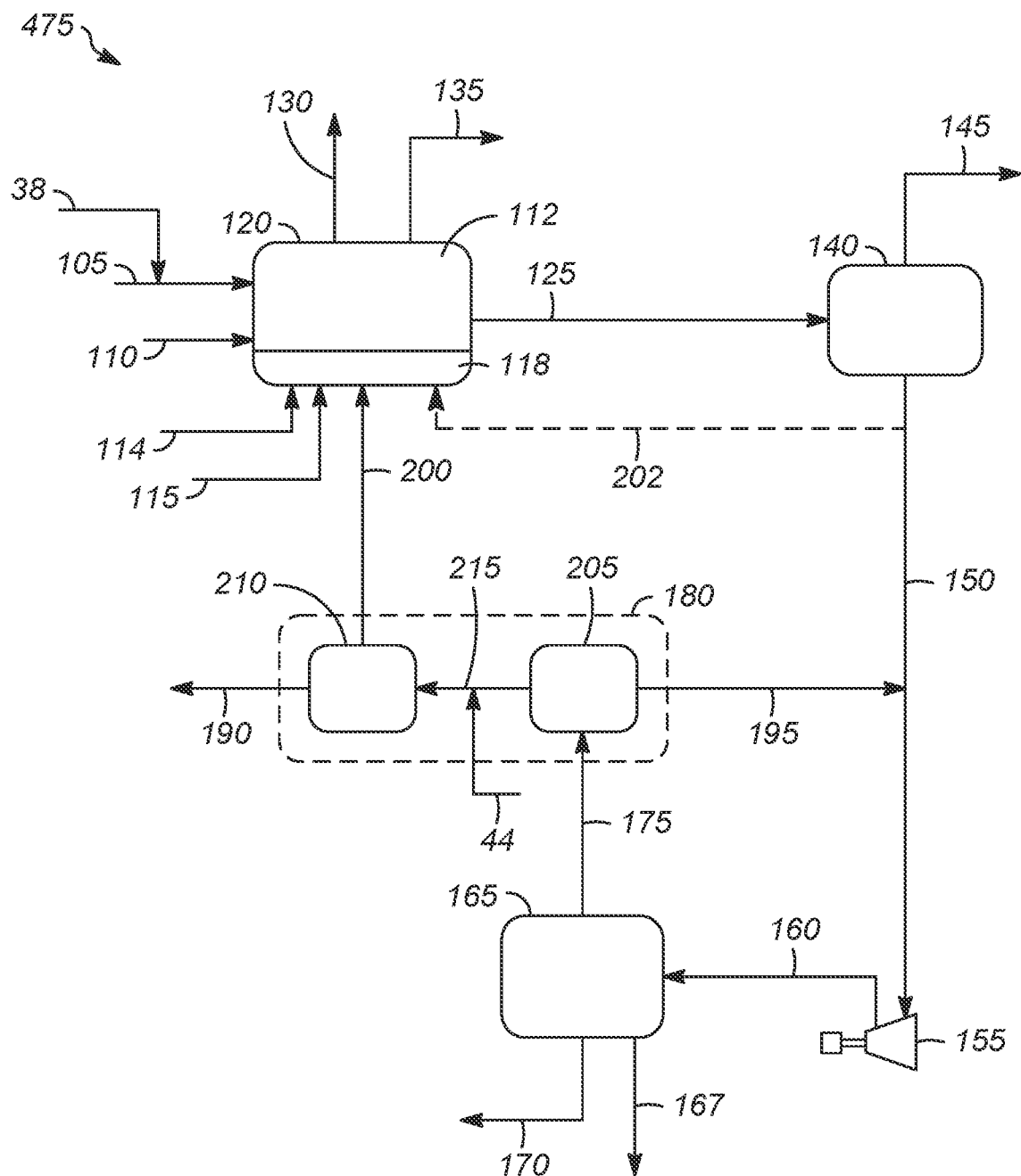
FIG. 6 is an illustration of another embodiment of a method of producing a hydrogen stream and a $CO_2$ stream from an effluent stream of a hydrogen production process unit using the PSA system that produces at least two product streams of the present invention.

FIG. 6 illustrates another embodiment of a hydrogen production process 475 of the present invention. Natural gas feed 105 and water 110 are sent to the reaction section 112 of the steam reforming process unit 120, and assist fuel gas 114 and air 115 are sent to a furnace 118 in the steam reforming process unit 120. Other feed streams comprising hydrocarbons could be used instead of natural gas, as discussed above. The assist fuel gases are described above.

The reforming reaction produces an effluent stream 125 comprising hydrogen, $CO_2$, water, and at least one of methane, carbon monoxide, and nitrogen. Flue gas stream 130 and steam stream 135 also exit the steam reforming process unit 120.

Effluent stream 125 is sent to hydrogen PSA unit 140 where it is separated into a high purity hydrogen stream 145 enriched in hydrogen and a hydrogen depleted tail gas stream 150 comprising a portion of the hydrogen, the $CO_2$, the water, and at least a portion of the at least one of the methane, carbon monoxide, and nitrogen.

The tail gas stream 150 is sent to compressor 155. Compressed tail gas stream 160 is sent to the $CO_2$ recovery system 165 for separation into a bottoms stream 170 and an overhead stream 175. The bottoms stream 170 comprising liquid $CO_2$ is recovered.

The overhead stream 175 is sent to the PSA system that produces at least two product streams 180 comprising two PSA units 205, 210 in series. The overhead stream 175 is separated into the low-pressure $CO_2$ stream 195 and a high-pressure stream 215 which comprises the hydrogen and at least one of the methane, carbon monoxide, and nitrogen. All or a portion of high-pressure hydrogen stream 190 can be sent to the bio-renewable conversion process and combined with the make-up hydrogen stream 42. The low-pressure $CO_2$ stream 195 is recycled to the compressor 155.

The purge gas stream comprising hydrogen 44 from the bio-renewable conversion process is combined with the high-pressure stream 215.

The high-pressure stream 215 is sent to the second PSA unit 210 where it is separated into the high-pressure hydrogen stream 190 and low-pressure tail gas stream 200. The high-pressure hydrogen stream 190 is recovered. The low-pressure tail gas stream 200 comprising at least one of the methane, carbon monoxide, and nitrogen is sent to the steam reforming process unit 120 as fuel.

Bypass line 202 sends the tail gas stream 150 to the furnace 118 in the steam reforming process unit 120 for combustion.

Figure 7:
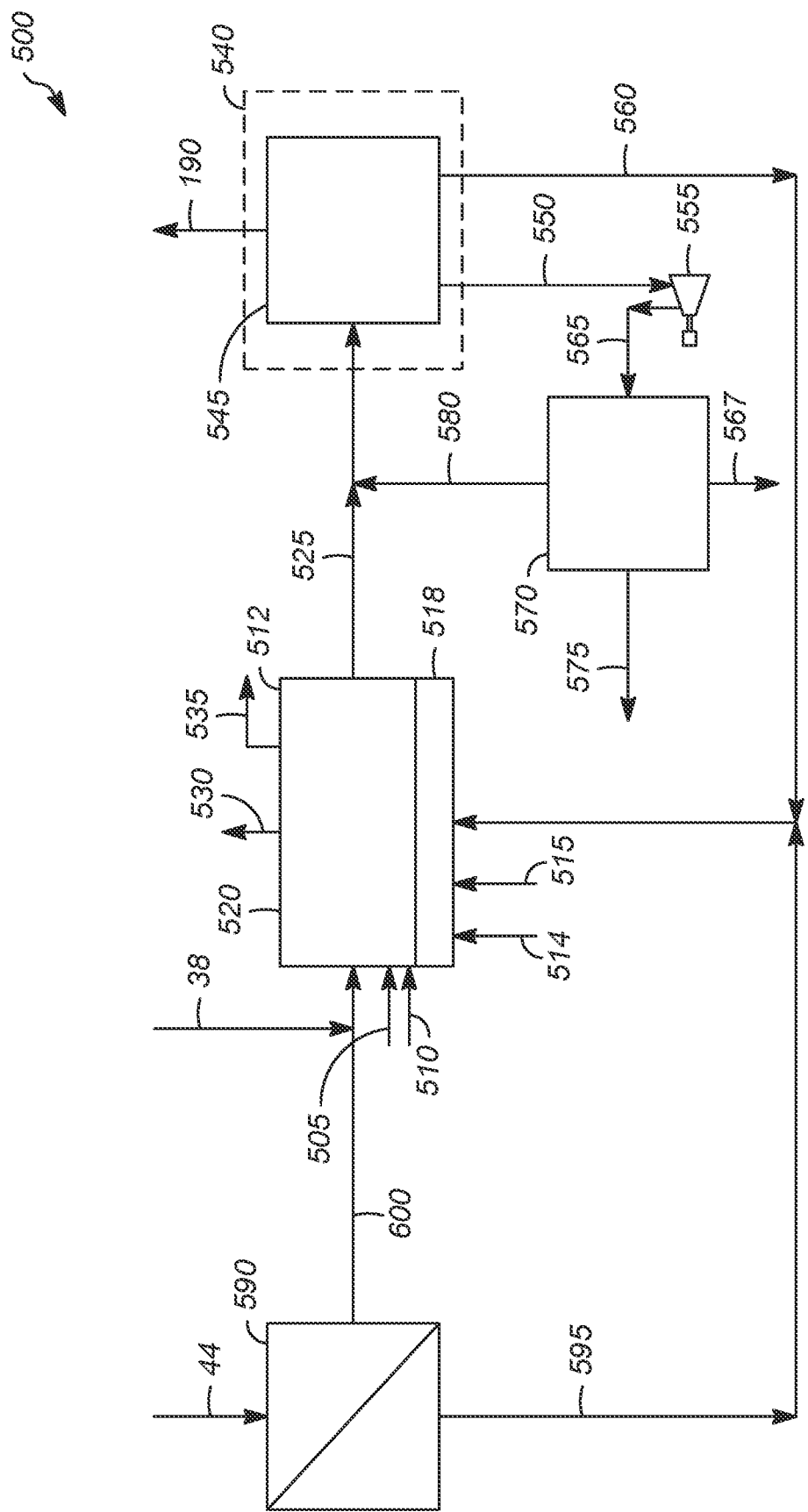
FIG. 7 is an illustration of another embodiment of a method of producing a hydrogen stream and a $CO_2$ stream from an effluent stream of a hydrogen production process unit using the PSA system that produces at least two product streams of the present invention.

FIG. 7 illustrates one embodiment of a hydrogen production process 500 incorporating the three-product PSA unit of the present invention. Natural gas feed 505 and water 510 are sent to the reaction section 512 of the steam reforming process unit 520, and assist fuel gas 514 and air 515 are sent to the furnace 518 in the steam reforming process unit 520. Other feed streams comprising hydrocarbons could be used instead of natural gas, as discussed above. The assist fuel gases are described above.

A portion of fractionation zone overhead stream 36 comprising naphtha and LPG may be sent in line 38 as part of the feed for the steam reforming process unit 520.

The steam reforming and water-gas shift reactions produce an effluent stream 525 comprising hydrogen, $CO_2$, water and at least one of methane, carbon monoxide, and nitrogen. Flue gas stream 530 and steam stream 535 also exit the steam reforming process unit 520.

Effluent stream 525 has a temperature of or about 30° C. to about 50° C. (after heat recovery and cooling in the steam reforming process), and a pressure of about 2,000 to about 3,000 kPa. Effluent stream 525 is sent to the PSA system that produces at least two product streams 540 comprising a three-product PSA unit 545 where it is separated into a high purity hydrogen stream 190 enriched in hydrogen and a hydrogen depleted tail gas stream 550 comprising a portion of the hydrogen, the $CO_2$, the water, and at least a portion of the at least one of the methane, carbon monoxide, and nitrogen. Alternatively, the PSA system that produces at least two product streams 540 could be a PSA unit with two product streams or two PSA unit with two product streams, as described above.

The high purity stream 190 can be sent to the bio-renewable conversion process to use as part or all of the hydrogen in the reaction zone 12.

The tail gas stream 550 is sent to compressor 555 where it is compressed from a pressure in the range of about 110 kPa to about 200 kPa to a pressure in the range of about 3,000 kPa to about 6,000 kPa.

Compressed tail gas stream 565 is sent to a $CO_2$ recovery unit 570 where it is dried to remove water stream 567, cooled to a temperature of about −20° C. to about −50° C., and separated into a bottoms stream 575 and an overhead stream 580. The bottoms stream 575 comprising liquid $CO_2$ is recovered.

The overhead stream 580 is sent to the PSA system that produces at least two product streams 540.

Intermediate pressure vent gas stream 560 comprising at least a portion of the at least one of the methane, carbon monoxide, and nitrogen and hydrogen (e.g., in some embodiments, the hydrogen is less than about 20 mol %, or about 10 mol % to about 20 mol %, while in others it can greater than 90 mol %) is sent to the steam reforming process unit 520 as fuel.

The purge gas stream comprising hydrogen 44 from the bio-renewable conversion process is sent to a membrane separation unit 590 where it is separated into a permeate stream 595 comprising hydrogen and $CO_2$, and a residue stream 600 comprising at least one of methane, ethane, propane, C4+ hydrocarbons and carbon monoxide. The permeate stream 595 is sent to the furnace 518. The residue stream 600 is sent to the steam reforming process unit 520.

Figure 8:
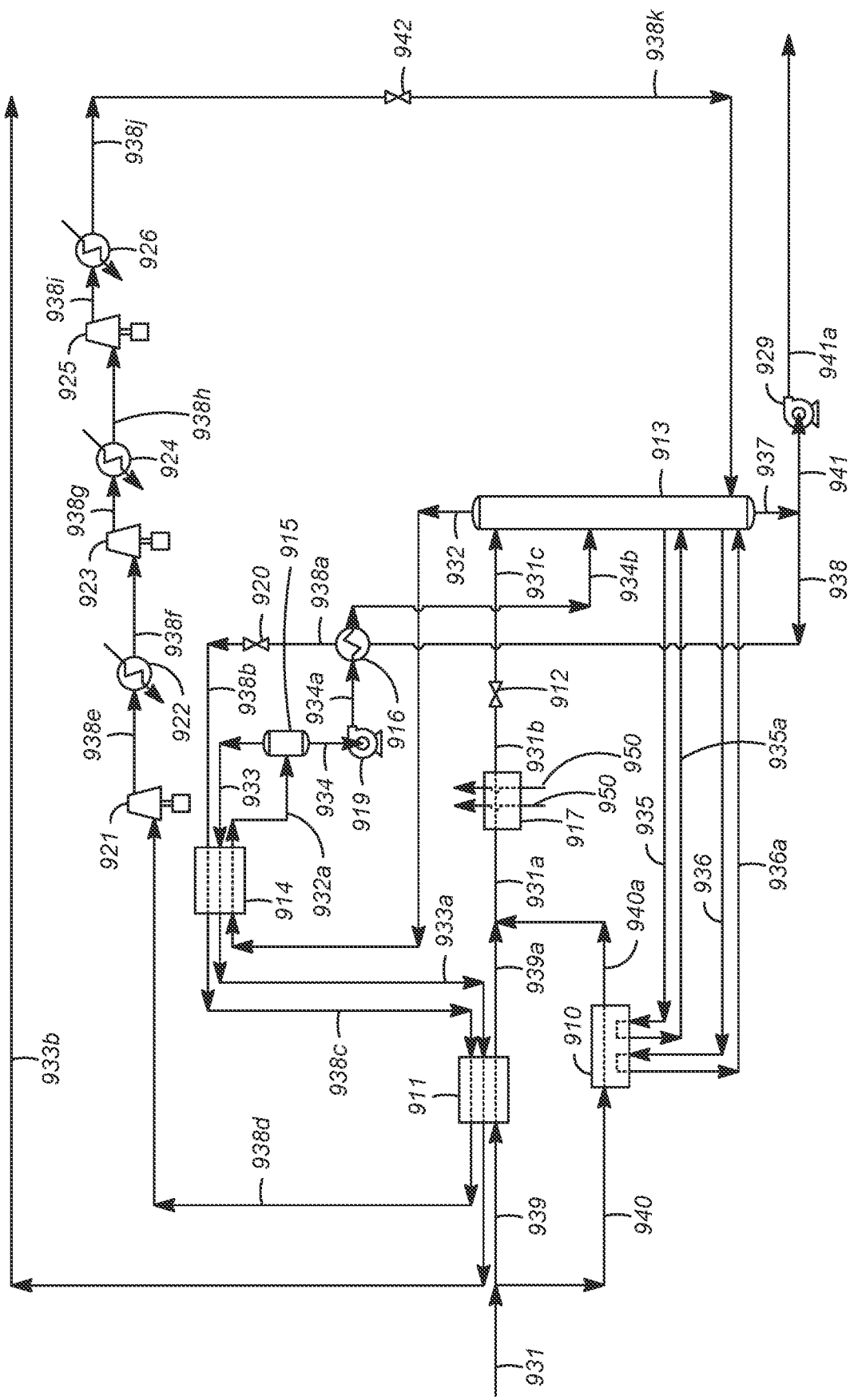
FIG. 8 is an illustration of one embodiment of a $CO_2$ recovery system using a dual refrigerant $CO_2$ fractionation process.

FIG. 8 is a process flow diagram showing the design of a $CO_2$ recovery system to remove carbon dioxide from hydrogen and lighter components from a synthetic gas stream. The process involves the use of a dual refrigerant $CO_2$ fractionation process.

In this process, inlet gas enters the plant as feed stream 931. The feed stream 931 is usually dehydrated to prevent hydrate (ice) formation under cryogenic conditions. Solid and liquid desiccants have both been used for this purpose.

The feed stream 931 is split into two streams (stream 939 and 940). Stream 939 is cooled in heat exchanger 911 by heat exchange with cool carbon dioxide vapor (stream 938*c*) and cold residue gas stream 933*a*. Stream 940 is cooled in heat exchanger 910 by heat exchange with column reboiler liquids (stream 936) and column side reboiler liquids (stream 935). The cooled streams from heat exchangers 910 and 911 are recombined into stream 931*a*. Stream 931*a* is further cooled with commercial refrigerant 950 (propane or R-134A, for example) and the resultant stream (cooled stream 931*b*) is expanded to the operating pressure of fractionation tower 913 by expansion valve 912, cooling stream 931*c* before it is supplied to fractionation tower 913 at its top column feed point.

Overhead vapor stream 932 leaves fractionation tower 913 and is cooled and partially condensed in heat exchanger 914. The partially condensed stream 932*a* enters separator 915 where the vapor (cold residue gas stream 933) is separated from the condensed liquid stream 934. Condensed liquid stream 934 is pumped to slightly above the operating pressure of fractionation tower 913 by pump 919 before liquid stream 934*a* enters heat exchanger 916 and is heated and partially vaporized by heat exchange with carbon dioxide refrigerant from the bottom of the fractionation column (described below). The partially vaporized stream 934*b* is thereafter supplied as feed to fractionation tower 913 at a mid-column feed point. A cold compressor (not shown) can be applied to overhead vapor stream 932 if higher pressure and/or lower carbon dioxide content is desired in the feed to the PSA system. If a compressor is used on this stream, then the pump 919 can be eliminated, and the liquid from separator 915 would then be sent to fractionation tower 913 via a liquid level control valve.

Fractionation tower 913 is a conventional distillation column containing a plurality of vertically spaced trays, one or more packed beds, or some combination of trays and packing. It also includes reboilers (such as the reboiler and the side reboiler described previously) which heat and vaporize a portion of the liquids flowing down the column to provide the stripping vapors which flow up the column to strip the column bottom liquid product stream 937 of hydrogen and lighter components. The trays and/or packing provide the necessary contact between the stripping vapors rising upward and cold liquid falling downward, so that the column bottom liquid product stream 937 exits the bottom of the tower, based on reducing the hydrogen and lighter component concentration in the bottom product to make a very pure carbon dioxide product.

Column bottom liquid product stream 937 is predominantly liquid carbon dioxide. A small portion (stream 938) is subcooled in heat exchanger 916 by liquid stream 934*a* from separator 915 as described previously. The subcooled liquid (stream 938*a*) is expanded to lower pressure by expansion valve 920 and partially vaporized, further cooling stream 938*b* before it enters heat exchanger 914. Stream 938*b* functions as refrigerant in heat exchanger 914 to provide cooling of partially condensed stream 932*a* as described previously, with the resulting carbon dioxide vapor leaving as stream 938*c*.

The cool carbon dioxide vapor from heat exchanger 914 (stream 938*c*) is heated in heat exchanger 911 by heat exchange with the feed gas as described previously. The warm carbon dioxide vapor (stream 938*d*) is then compressed to a pressure above the pressure of fractionation tower 913 in three stages by compressors 921, 923, and 925, with cooling after each stage of compression by discharge coolers 922, 924, and 926. The compressed carbon dioxide stream (stream 938*j*) is then flash expanded through valve 942 and returned to a bottom feed location in fractionation tower 913. The recycled carbon dioxide (stream 938*k*) provides further heat duty and stripping gas in fractionation tower 913. The remaining portion (stream 941) of column bottom liquid product stream 937 is pumped to high pressure by pump 929 so that stream 941*a* forms a high-pressure carbon dioxide stream which then flows to pipeline or reinjection. In certain instances, the carbon dioxide stream needs to be delivered as a sub-cooled liquid at lower pressure that can be transported in insulated shipping containers. For these cases, the carbon dioxide product (stream 941) is sub-cooled in heat exchanger 917 with refrigerant 950 before being let down to storage tank conditions. Therefore pump 929 is eliminated.

The cold residue gas stream 933 leaves separator 915 and provides additional cooling in heat exchanger 914. The warmed residue gas stream 933*a* is further heated after heat exchange with the feed gas in heat exchanger 911 as described previously. The warm residue gas stream 933*b* is then sent to the PSA system for further treating.

Figure 9:
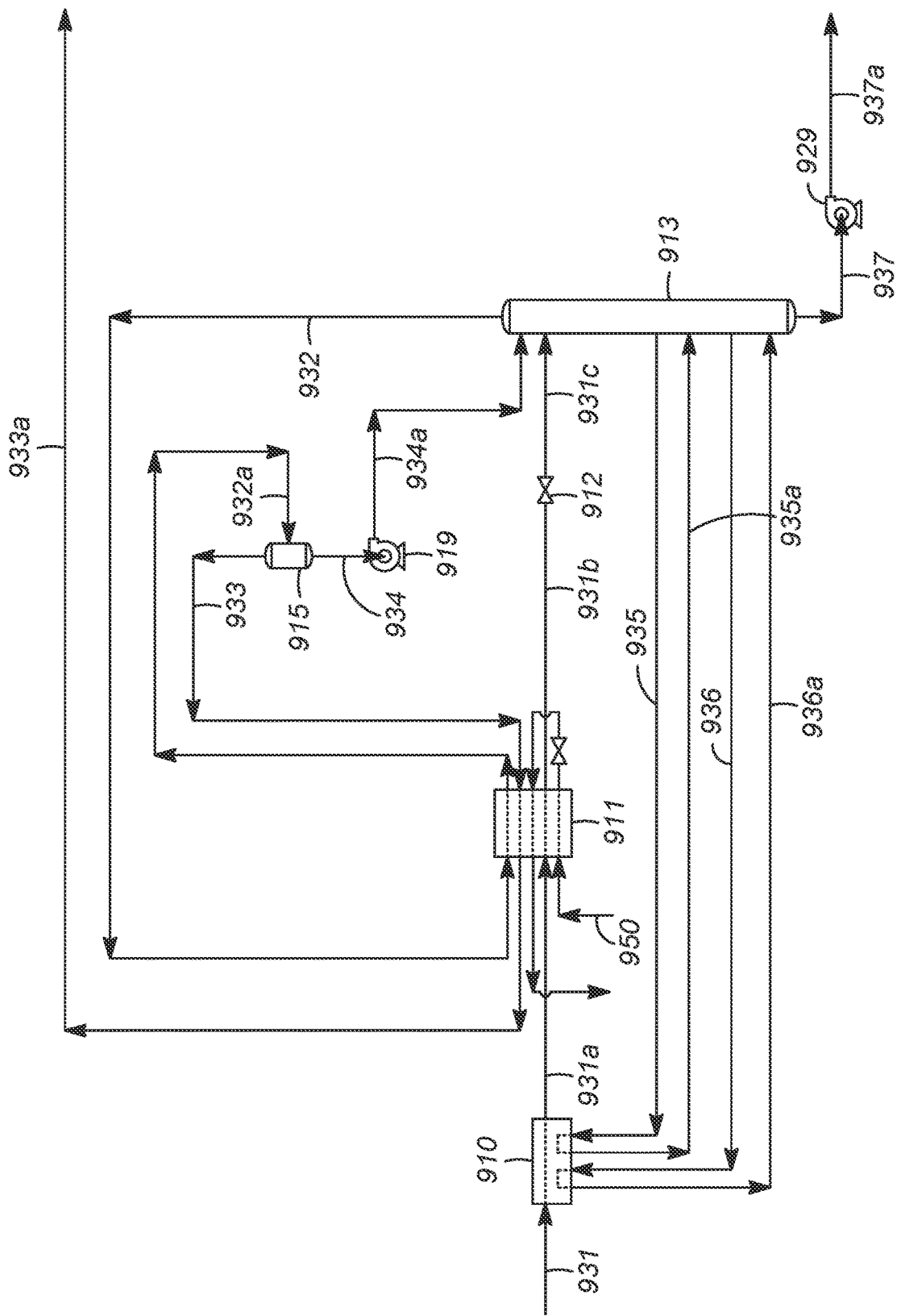
FIG. 9 is an illustration of another embodiment of a $CO_2$ recovery system using a mixed refrigerant $CO_2$ fractionation process.

FIG. 9 is a process flow diagram showing the design of a processing unit to remove carbon dioxide from hydrogen and lighter components from a synthetic gas stream. In this process, inlet gas enters the plant as feed stream 931. The process involves the use of a mixed refrigerant $CO_2$ fractionation process.

The feed stream 931 is usually dehydrated to prevent hydrate (ice) formation under cryogenic conditions. Solid and liquid desiccants have both been used for this purpose.

The feed stream 931 is cooled in heat exchanger 910 by heat exchange with column reboiler liquids (stream 936) and column side reboiler liquids (stream 935). Stream 931*a* is further cooled in heat exchanger 911 by heat exchange with cold residue gas stream 933, and a flash expanded multi-component mixed refrigerant stream comprised of both hydrocarbon and non-hydrocarbon components. The component mixture in the mixed refrigerant stream is designed to provide the most efficient cooling curve in heat exchanger 911 based on the inlet gas feed conditions. The further cooled stream 931*b* is expanded to the operating pressure of fractionation tower 913 by expansion valve 912, and sent to fractionation tower 913 at a mid-column feed point.

Overhead vapor stream 932 leaves fractionation tower 913 and is cooled and partially condensed in heat exchanger 911 with the mixed refrigerant stream. The partially condensed stream 932*a* enters separator 915 where the vapor (cold residue gas stream 933) is separated from the condensed liquid stream 934. Condensed liquid stream 934 is pumped to slightly above the operating pressure of fractionation tower 913 by pump 919 before liquid stream 934*a* is sent to fractionation tower 913 at the top feed point. A cold compressor (not shown) can be applied to overhead vapor stream 932 if higher pressure and/or lower carbon dioxide content is desired in the feed to the PSA system. If a compressor is used on this stream, then the pump 919 can be eliminated, and the liquid from separator 915 would then be sent to fractionation tower 913 via a liquid level control valve.

Fractionation tower 913 is a conventional distillation column containing a plurality of vertically spaced trays, one or more packed beds, or some combination of trays and packing. It also includes reboilers (such as the reboiler and the side reboiler described previously) which heat and vaporize a portion of the liquids flowing down the column to provide the stripping vapors which flow up the column to strip the column bottom liquid product stream 937 of hydrogen and lighter components. The trays and/or packing provide the necessary contact between the stripping vapors rising upward and cold liquid falling downward, so that the column bottom liquid product stream 937 exits the bottom of the tower, based on reducing the hydrogen and lighter component concentration in the bottom product to make a very pure carbon dioxide product.

Column bottom liquid product stream 937 is predominantly liquid carbon dioxide. Column bottom liquid product stream 937 is pumped to high pressure by pump 929 so that stream 937*a* forms a high-pressure carbon dioxide stream which then flows to pipeline or reinjection. In certain instances, the carbon dioxide stream needs to be delivered as a sub-cooled liquid at lower pressure that can be transported in insulated shipping containers. For these cases, the carbon dioxide product in column bottom liquid product stream 937 is sub-cooled in heat exchanger 911 with mixed refrigerant 950 before being let down to storage tank conditions. Therefore pump 929 is eliminated.

The warm-residue gas stream 933*a* leaves heat exchanger 911 after heat exchange with the feed gas as described previously. The warm residue gas stream 933*a* is then sent to the PSA system for further treating.

EXAMPLES

The following examples are intended to further illustrate the integrated process. They are not meant to limit the claims of the invention to the particular details of the examples. The examples are computer simulations of two embodiments of the process, as explained below.

Example 1 (for FIG. 4 Configuration)

|  | Hydrogen Purge Gas, Stream 44 | Membrane Permeate, Stream 410 | Membrane Residue, Stream 415 |
|---|---|---|---|
| Pressure, kPa | 5290 | 1150 | 5190 |
| Temperature, oC | 55 | 55 | 55 |
| Flow, kgmol/hr | 850 | 663 | 187 |
| Composition, mol % |  |  |  |
| Hydrogen | 82.8 | 96.2 | 35.2 |
| CO2 | 4.30 | 2.94 | 9.0 |
| Methane | 6.10 | 0.37 | 26.4 |
| Ethane | 0.73 | 0.02 | 3.3 |
| Propane | 3.40 | 0.04 | 15.5 |
| n-Butane | 0.68 | 0.00 | 3.1 |
| Carbon Monoxide | 1.8 | 0.19 | 7.5 |
| Water | 0.19 | 0.24 | 0.0 |

The above results show that about 900 of hydrogen and greater than 50 of $CO_2$ in hydrogen purge gas stream 44 is recovered in the permeate stream 410. This hydrogen is recovered in the overhead PSA system in high-pressure hydrogen stream 190 and this $CO_2$ is recovered in $CO_2$ recovery system 165 in bottoms stream 170. Nearly 1000% of propane and n-butane is recovered in membrane residue stream 415 and is sent to the bio-renewable process for recovery.

Example 2 (for FIG. 6 Configuration)

|  | Hydrogen Purge Gas, Stream 44 |
| --- | --- |
| Pressure, kPa | 5290 |
| Temperature, oC | 40 |
| Flow, kgmol/hr | 850 |
| Composition, mol % |  |
| Hydrogen | 82.8 |
| CO2 | 4.30 |
| Methane | 6.10 |
| Ethane | 0.73 |
| Propane | 3.40 |
| n-Butane | 0.68 |
| Carbon Monoxide | 1.8 |
| Water | 0.19 |

The above stream was fed to the second PSA unit 210. About 900% of the hydrogen in purge stream 44 was recovered in high-pressure hydrogen stream 190. Nearly 1000% of the other components in purge stream 44 were recovered in low-pressure tail gas stream 200. These components were sent as fuel gas to furnace 118.

As used herein, the term "stream" can include various hydrocarbon molecules and other substances.

As used herein, the term "stream", "feed", "product", "part" or "portion" can include various hydrocarbon molecules, such as straight-chain and branched alkanes, naphthenes, alkenes, alkadienes, and alkynes, and optionally other substances, such as gases, e.g., hydrogen, or impurities, such as heavy metals, and sulfur and nitrogen compounds. Each of the above may also include aromatic and non-aromatic hydrocarbons.

As used herein, the term "overhead stream" can mean a stream withdrawn at or near a top of a vessel, such as a column.

As used herein, the term "bottoms stream" can mean a stream withdrawn at or near a bottom of a vessel, such as a column.

As used herein, the term "unit" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top or overhead pressure is the pressure of the overhead vapor at the vapor outlet of the column. The bottom temperature is the liquid bottom outlet temperature. Net overhead lines and net bottoms lines refer to the net lines from the column downstream of any reflux or reboil to the column unless otherwise shown. Stripping columns may omit a reboiler at a bottom of the column and instead provide heating requirements and separation impetus from a fluidized inert media such as steam. Reboiled absorber columns may omit a condenser at the top of the column.

As depicted, process flow lines in the drawings can be referred to interchangeably as, e.g., lines, pipes, feeds, gases, products, discharges, parts, portions, or streams.

The term "passing" means that the material passes from a conduit or vessel to an object.

The terms "hydrogen-enriched" and "stream enriched in hydrogen" mean that the hydrogen content/concentration of the product stream is higher than the inlet gas stream. For example, in some embodiments, the product stream may contain greater than 40 mol % hydrogen, or greater than 50 mol %, or greater than 60 mol %, or greater than 70 mol %, or greater than 80 mol %, or greater than 90 mol %, or greater than 95 mol %, or greater than 98 mol %, or greater than 99 mol %, or greater than 99.9 mol %.

The terms "$CO_2$-enriched" and "stream enriched in $CO_2$" mean that the $CO_2$ content/concentration of the product stream is higher than the inlet gas stream. For example, in some embodiments, the product stream may contain greater than 40 mol % $CO_2$, or greater than 50 mol %, or greater than 60 mol %, or greater than 70 mol %, or greater than 80 mol %, or greater than 90 mol %, or greater than 95 mol %, or greater than 98 mol %, or greater than 99 mol %, or greater than 99.9 mol %.

As used herein, the term "about" means within 10% of the value, or within 5%, or within 1%.

Specific Embodiments

While the following is described in conjunction with specific embodiments, it will be understood that this description is intended to illustrate and not limit the scope of the preceding description and the appended claims.

A first embodiment of the invention is a method of producing a hydrogen-enriched product and recovering $CO_2$ from a hydrogen production process unit comprising processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon; separating an effluent stream from the hydrogen production process unit in a first pressure swing adsorption (PSA) system that produces at least two product streams into at least a first high-pressure hydrogen stream enriched in hydrogen and a hydrogen depleted tail gas stream; compressing the hydrogen depleted tail gas stream in a compressor to form a compressed tail gas stream; separating the compressed tail gas stream in a $CO_2$ recovery system producing a $CO_2$ product and a second gas stream comprising hydrogen; and introducing at least a portion of a purge gas stream comprising hydrogen from a bio-renewable conversion process for making a hydrocarbon product from a bio-renewable feedstock into a process unit used in the method of producing hydrogen and recovering $CO_2$. An embodiment of the invention is one, any or all of prior embodiments in this paragraph up through the first embodiment in this paragraph wherein the process unit comprises a steam reforming process unit with an optional gas heated reformer and wherein the purge gas stream comprising hydrogen from the bio-renewable conversion process is combusted in a furnace in the steam reforming process unit with the optional gas heated reformer. An embodiment of the invention is one, any or all of prior embodiments in this paragraph up through the first embodiment in this paragraph wherein the first PSA system that produces at least two product streams comprises a first PSA unit that produces two product streams, and wherein the first PSA unit separates the effluent stream into the first high-pressure hydrogen stream enriched in hydrogen and the hydrogen depleted tail gas stream; and wherein separating the compressed tail gas stream comprises separating the compressed tail gas stream in the $CO_2$ recovery system into a $CO_2$-enriched product stream and an overhead stream comprising the portion of the hydrogen, a portion of the carbon dioxide, and the at least the portion of the at least one of the methane, the carbon monoxide, the nitrogen, and the argon; separating the overhead stream from the the $CO_2$ recovery system in a second PSA system that produces at least two product streams into at least a second high-pressure hydrogen stream enriched in hydrogen, and a low-pressure $CO_2$ stream enriched in carbon dioxide; recovering the second high-pressure hydrogen stream; and optionally recycling the low-pressure $CO_2$ stream to the compressor. An embodiment of the invention is one, any or all of prior embodiments in this paragraph up through the first embodiment in this paragraph wherein the process unit comprises the second PSA system that produces at least two product streams, and wherein the second PSA system that produces at least two product streams comprises two PSA units that each produce with two product streams and wherein separating the overhead stream from the $CO_2$ recovery system comprises; introducing the overhead stream into the first PSA unit and separating the overhead stream into the low-pressure $CO_2$ stream and a third high-pressure hydrogen stream enriched in hydrogen; feeding the third high-pressure hydrogen stream into the second PSA unit, and wherein the second high-pressure hydrogen stream and a second gas stream are removed from the second PSA unit; and wherein the purge gas stream comprising hydrogen from the bio-renewable conversion process is introduced into the second PSA unit. An embodiment of the invention is one, any or all of prior embodiments in this paragraph up through the first embodiment in this paragraph further comprising separating the purge gas stream comprising hydrogen from the bio-renewable conversion process in a membrane separation unit into a permeate stream comprising hydrogen and $CO_2$, and a residue stream comprising at least one of methane, ethane, propane, C4+ hydrocarbons, and carbon monoxide; and wherein the process unit comprises the compressor, and wherein the permeate stream is compressed in the compressor. An embodiment of the invention is one, any or all of prior embodiments in this paragraph up through the first embodiment in this paragraph further comprising at least one of wherein a second process unit comprises a steam reforming process unit with an optional gas heated reformer, and further comprising combusting the residue stream in a furnace or fired heater in the steam reforming process unit with the optional gas heated reformer; wherein a second process unit comprises a steam reforming process unit with an optional gas heated reformer, and further comprising mixing the residue stream with the feed stream comprising hydrocarbons in the steam reforming process unit with the optional gas heated reformer; wherein the process unit comprises an autothermal reforming unit with an optional gas heated reformer, a gasification unit, or a partial oxidation unit and further comprising mixing the residue stream with the feed stream comprising hydrocarbons or a carbonaceous feedstock and partially oxidizing the mixed stream in the autothermal reforming unit with the optional gas heated reformer, the gasification unit, or the partial oxidation unit; and passing the residue stream to the bio-renewable conversion process, and recovering at least one of the propane and the C4+ hydrocarbons from the residue stream. An embodiment of the invention is one, any or all of prior embodiments in this paragraph up through the first embodiment in this paragraph wherein the process unit comprises the $CO_2$ recovery system and wherein the purge gas stream comprising hydrogen from the bio-renewable conversion process is introduced into the $CO_2$ recovery system. An embodiment of the invention is one, any or all of prior embodiments in this paragraph up through the first embodiment in this paragraph wherein at least a portion of the feed stream comprising hydrocarbons for the hydrogen production process comprises at least a portion of a naphtha stream, a liquefied petroleum gas stream, or an off gas stream from a product fractionation zone in the bio-renewable conversion process, or wherein at least a portion of a fuel stream for a furnace in the hydrogen production process comprises at least a portion of a naphtha stream, a liquefied petroleum gas stream, or an off gas stream from a product fractionation zone in the bio-renewable conversion process. An embodiment of the invention is one, any or all of prior embodiments in this paragraph up through the first embodiment in this paragraph wherein the PSA system that produces at least two product streams comprises a three-product PSA unit and wherein separating the overhead stream from the $CO_2$ recovery system comprises introducing the overhead stream into the three-product PSA unit having a three-product PSA cycle; removing the second high-pressure hydrogen stream during a high-pressure, co-current adsorption step in the three-product PSA cycle; removing a second gas stream during a co-current depressurization step in the three-product PSA cycle; and removing the low-pressure $CO_2$ stream during at least one of a counter-current depressurization step and a counter-current purge step in the three-product PSA cycle. An embodiment of the invention is one, any or all of prior embodiments in this paragraph up through the first embodiment in this paragraph wherein separating the effluent stream from the hydrogen production process unit in the first PSA system that produces at least two product streams into at least the first high-pressure hydrogen stream enriched in hydrogen and the hydrogen depleted tail gas stream comprises separating the effluent stream from the hydrogen production process unit in the first PSA system that produces at least two product streams into the first high-pressure hydrogen stream enriched in hydrogen, the hydrogen depleted tail gas stream, and a second gas stream comprising a portion of the hydrogen, and at least a portion of at least one of the methane, carbon monoxide, and nitrogen, and further comprising at least one of: introducing at least a portion of the first high-pressure hydrogen stream enriched in hydrogen into the bio-renewable conversion process; and combusting at least a portion of the second gas stream in the hydrogen production process unit. An embodiment of the invention is one, any or all of prior embodiments in this paragraph up through the first embodiment in this paragraph further comprising separating the purge gas stream comprising hydrogen from the bio-renewable conversion process in a membrane separation unit into a permeate stream comprising hydrogen and $CO_2$, and a residue stream comprising at least one of methane, ethane, propane, C4+ hydrocarbons, and carbon monoxide; and wherein the process unit comprises the hydrogen production process unit and wherein the permeate stream is introduced into a furnace, or wherein the residue stream comprises at least a portion of the feed stream, or both.

A second embodiment of the invention is a method of producing a hydrogen-enriched product and recovering $CO_2$ in an integrated hydrogen production process and bio-renewable conversion process, the integrated process comprising processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon; separating an effluent stream from the hydrogen production process unit in a first pressure swing adsorption (PSA) system that produces that produces at least two product streams into at least a first high-pressure hydrogen stream enriched in hydrogen and a hydrogen depleted tail gas stream compressing the hydrogen depleted tail gas stream in a compressor to form a compressed tail gas stream; separating the compressed tail gas stream in a $CO_2$ recovery system producing a $CO_2$ product and second gas stream comprising hydrogen; hydrogenating, deoxygenating, isomerizing, and selectively hydrocracking a bio-renewable feedstock in a reaction zone in the presence of hydrogen at reaction conditions by contacting the bio-renewable feedstock with a multifunctional catalyst or a set of catalysts having hydrogenation, deoxygenation, isomerization, and selective hydrocracking functions to provide a reaction effluent comprising paraffinic hydrocarbons, hydrogen, $CO_2$, water, and at least one of methane, ethane, propane, C4+ hydrocarbons, and carbon monoxide; separating the reaction effluent in a separator into at least a hydrocarbon stream comprising the paraffinic hydrocarbons and an overhead stream comprising hydrogen, $CO_2$, optionally water, and at least one of methane, ethane, propane, C4+ hydrocarbons, and carbon monoxide; separating the hydrocarbon stream in a fractionation zone to generate a hydrocarbon product stream, wherein the hydrocarbon product stream comprises at least one of a diesel stream comprising hydrocarbons having boiling points in a diesel boiling point range, an aviation fuel stream having hydrocarbons having boiling points in an aviation fuel boiling point range, and a naphtha stream having hydrocarbons in a naphtha boiling point range; recovering the hydrocarbon product stream; separating the overhead stream from the separator into at least a hydrogen stream comprising hydrogen; and introducing at least a portion of a purge gas stream comprising hydrogen from the hydrogen stream from the bio-renewable conversion process into a process unit in the hydrogen production process. An embodiment of the invention is one, any or all of prior embodiments in this paragraph up through the second embodiment in this paragraph further comprising wherein at least a portion of the feed stream comprising hydrocarbons for the hydrogen production process unit comprises at least a portion of a naphtha stream, a liquefied petroleum gas stream, or an off gas stream from a product fractionation zone in the bio-renewable conversion process, or wherein at least a portion of a fuel stream for a furnace in the hydrogen production process comprises at least a portion of a naphtha stream, a liquefied petroleum gas stream, or an off gas stream from a product fractionation zone in the bio-renewable conversion process. An embodiment of the invention is one, any or all of prior embodiments in this paragraph up through the second embodiment in this paragraph wherein the process unit comprises a steam reforming process unit with an optional gas heated reformer, and wherein the purge gas stream comprising hydrogen is combusted in a furnace in the steam reforming process unit with the optional gas heated reformer. An embodiment of the invention is one, any or all of prior embodiments in this paragraph up through the second embodiment in this paragraph wherein the first PSA system that produces at least two product streams comprises a first PSA unit with two product streams, and wherein the first PSA unit separates the effluent stream into the first high-pressure hydrogen stream enriched in hydrogen and the hydrogen depleted tail gas stream; and wherein separating the compressed tail gas stream comprises separating the compressed tail gas stream in the $CO_2$ recovery system into a $CO_2$-enriched product stream and an overhead stream comprising the portion of the hydrogen, a portion of the carbon dioxide, and the at least the portion of the at least one of the methane, the carbon monoxide, the nitrogen, and the argon; separating the overhead stream from the $CO_2$ recovery system in a second PSA system that produces at least two product streams into at least a second high-pressure hydrogen stream enriched in hydrogen, and a low-pressure $CO_2$ stream enriched in carbon dioxide; recovering the second high-pressure hydrogen stream; and optionally recycling the low-pressure $CO_2$ stream to the compressor. An embodiment of the invention is one, any or all of prior embodiments in this paragraph up through the second embodiment in this paragraph wherein the process unit comprises the second PSA system that produces at least two product streams, and wherein the second PSA system that produces at least two product streams comprises two PSA units each with two product streams and wherein separating the overhead stream from the $CO_2$ recovery system comprises; introducing the overhead stream into the first PSA unit and separating the overhead stream into the low-pressure $CO_2$ stream and a third high-pressure hydrogen stream; feeding the third high-pressure third stream into the second PSA unit, and wherein the second high-pressure hydrogen stream and a second gas stream are removed from the second PSA unit; and wherein the purge gas stream comprising hydrogen from the bio-renewable process is introduced into the second PSA unit. An embodiment of the invention is one, any or all of prior embodiments in this paragraph up through the second embodiment in this paragraph further comprising separating the purge gas stream comprising hydrogen in a membrane separation unit into a permeate stream comprising hydrogen and $CO_2$, and a residue stream comprising at least one of methane, ethane, propane, C4+ hydrocarbons and carbon monoxide; wherein the process unit comprises the compressor, and wherein the permeate stream is compressed in the compressor. An embodiment of the invention is one, any or all of prior embodiments in this paragraph up through the second embodiment in this paragraph further comprising at least one of wherein a second process unit comprises a steam reforming process unit with an optional gas heated reformer, and further comprising combusting the residue stream in a furnace or fired heater in the steam reforming process unit with the optional gas heated reformer; wherein a second process unit comprises a steam reforming process unit with an optional gas heated reformer, and further comprising mixing the residue stream with the feed stream comprising hydrocarbons in the steam reforming process unit with the optional gas heated reformer; wherein the process unit comprises an autothermal reforming unit with an optional gas heated reformer, a gasification unit, or a partial oxidation unit and further comprising mixing the residue stream with the feed stream comprising hydrocarbons or a carbonaceous feedstock and partially oxidizing the mixed stream in the autothermal reforming unit with the optional gas heated reformer, the gasification unit, or the partial oxidation unit; and passing the residue stream to the bio-renewable hydrocarbon production process, and recovering at least one of the propane and the C4+ hydrocarbons from the residue stream. An embodiment of the invention is one, any or all of prior embodiments in this paragraph up through the second embodiment in this paragraph wherein the process unit comprises the $CO_2$ recovery system and wherein the purge gas stream comprising hydrogen from the bio-renewable conversion process is introduced into the $CO_2$ recovery system. An embodiment of the invention is one, any or all of prior embodiments in this paragraph up through the second embodiment in this paragraph wherein the PSA system that produces at least two product streams comprises a three-product PSA unit and wherein separating the overhead stream from the $CO_2$ recovery system comprises introducing the overhead stream into the three-product PSA unit having a three-product PSA cycle; removing the second high-pressure hydrogen stream during a high-pressure, co-current adsorption step in the three-product PSA cycle; removing a second gas stream during a co-current depressurization step in the three-product PSA cycle; and removing the low-pressure $CO_2$ stream during at least one of a counter-current depressurization step and a counter-current purge step in the three-product PSA cycle. An embodiment of the invention is one, any or all of prior embodiments in this paragraph up through the second embodiment in this paragraph wherein separating the effluent stream from the hydrogen production process unit in the first PSA system that produces at least two product streams into at least the first high-pressure hydrogen stream enriched in hydrogen and the hydrogen depleted tail gas stream comprises separating the effluent stream from the hydrogen production process unit in the first PSA system that produces at least two product streams into the first high-pressure hydrogen stream enriched in hydrogen, the hydrogen depleted tail gas stream, and a second gas stream comprising a portion of the hydrogen, and at least a portion of at least one of the methane, carbon monoxide, and nitrogen, and further comprising at least one of: introducing at least a portion of the first high-pressure hydrogen stream enriched in hydrogen into the bio-renewable conversion process; and combusting at least a portion of the second gas stream in the hydrogen production process unit. An embodiment of the invention is one, any or all of prior embodiments in this paragraph up through the second embodiment in this paragraph further comprising separating the purge gas stream comprising hydrogen from the bio-renewable conversion process in a membrane separation unit into a permeate stream comprising hydrogen and $CO_2$, and a residue stream comprising at least one of methane, ethane, propane, C4+ hydrocarbons, and carbon monoxide; and wherein the process unit comprises the hydrogen production process unit and wherein the permeate stream is introduced into a furnace in the hydrogen production process unit, or wherein the residue stream comprises at least a portion of the feed stream, or both.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A method of producing a hydrogen-enriched product and recovering CO2 from a hydrogen production process unit comprising:
    processing a feed stream comprising hydrocarbons or a carbonaceous feedstock in a hydrogen production process unit to produce a synthesis gas mixture comprising hydrogen, carbon dioxide, water, and at least one of methane, carbon monoxide, nitrogen, and argon;
    separating an effluent stream from the hydrogen production process unit in a first pressure swing adsorption (PSA) system that produces at least two product streams into at least a first high-pressure hydrogen stream enriched in hydrogen and a hydrogen depleted tail gas stream;
    compressing the hydrogen depleted tail gas stream in a compressor to form a compressed tail gas stream;
    separating the compressed tail gas stream in a CO2 recovery system producing a CO2-enriched product stream and a second gas stream comprising hydrogen; and
    introducing at least a portion of a purge gas stream comprising hydrogen from a bio-renewable conversion process for making a hydrocarbon product from a bio-renewable feedstock into a process unit used in the method of producing hydrogen and recovering CO2.

2. The method of claim 1 wherein the process unit comprises a steam reforming process unit with an optional gas heated reformer and wherein the purge gas stream comprising hydrogen from the bio-renewable conversion process is combusted in a furnace in the steam reforming process unit with the optional gas heated reformer.

3. The method of claim 1 wherein the first PSA system that produces at least two product streams comprises a first PSA unit that produces two product streams, and wherein the first PSA unit separates the effluent stream into the first high-pressure hydrogen stream enriched in hydrogen and the hydrogen depleted tail gas stream; and wherein separating the compressed tail gas stream comprises:
    separating the compressed tail gas stream in the CO2 recovery system into a CO2-enriched product stream and an overhead stream comprising the portion of the hydrogen, a portion of the carbon dioxide, and the at least the portion of the at least one of the methane, the carbon monoxide, the nitrogen, and the argon;
    separating the overhead stream from the CO2 recovery system in a second PSA system that produces at least two product streams into at least a second high-pressure hydrogen stream enriched in hydrogen, and a low-pressure CO2 stream enriched in carbon dioxide;
    recovering the second high-pressure hydrogen stream; and
    optionally recycling the low-pressure CO2 stream to the compressor.

4. The method of claim 3 wherein the process unit comprises the second PSA system that produces at least two product streams, and wherein the second PSA system that produces at least two product streams comprises two PSA units that each produce two product streams and wherein separating the overhead stream from the CO2 recovery system comprises;
    introducing the overhead stream into the first PSA unit and separating the overhead stream into the low-pressure CO2 stream and a third high-pressure hydrogen stream enriched in hydrogen;
    feeding the third high-pressure hydrogen stream into the second PSA unit, and wherein the second high-pressure hydrogen stream and a second gas stream are removed from the second PSA unit; and
    wherein the purge gas stream comprising hydrogen from the bio-renewable conversion process is introduced into the second PSA unit.

5. The method of claim 3 further comprising:
separating the purge gas stream comprising hydrogen from the bio-renewable conversion process in a membrane separation unit into a permeate stream comprising hydrogen and CO2, and a residue stream comprising at least one of methane, ethane, propane, C4+ hydrocarbons, and carbon monoxide; and wherein the process unit comprises the compressor, and wherein the permeate stream is compressed in the compressor.

6. The method of claim 5 further comprising at least one of:
wherein a second process unit comprises a steam reforming process unit with an optional gas heated reformer, and further comprising combusting the residue stream in a furnace or fired heater in the steam reforming process unit with the optional gas heated reformer;
wherein a second process unit comprises a steam reforming process unit with an optional gas heated reformer, and further comprising mixing the residue stream with the
feed stream comprising hydrocarbons in the steam reforming process unit with the optional gas heated reformer;
wherein the process unit comprises an autothermal reforming unit with an optional gas heated reformer, a gasification unit, or a partial oxidation unit and further comprising mixing the residue stream with the feed stream comprising hydrocarbons or a carbonaceous feedstock and partially oxidizing the mixed stream in the autothermal reforming unit with the optional gas heated reformer, the gasification unit, or the partial oxidation unit; and
passing the residue stream to the bio-renewable convers10n process, and recovering at least one of the propane and the C4+ hydrocarbons from the residue stream.

7. The method of claim 3 wherein the process unit comprises the CO2 recovery system and wherein the purge gas stream comprising hydrogen from the bio-renewable conversion process is introduced into the CO2 recovery system.

8. The method of claim 1 wherein at least a portion of the feed stream comprising hydrocarbons for the hydrogen production process comprises at least a portion of a naphtha stream, a liquefied petroleum gas stream, or an off gas stream from a product fractionation zone in the bio-renewable conversion process, or wherein at least a portion of a fuel stream for a furnace in the hydrogen production process comprises at least a portion of a naphtha stream, a liquefied petroleum gas stream, or an off gas stream from a product fractionation zone in the bio-renewable conversion process.

9. The method of claim 1 further comprising:
separating the purge gas stream comprising hydrogen from the bio-renewable conversion process in a membrane separation unit into a permeate stream comprising hydrogen and CO2, and a residue stream comprising at least one of methane, ethane, propane, C4+ hydrocarbons, and carbon monoxide; and
wherein the process unit comprises the hydrogen production process unit and wherein the permeate stream is introduced into a furnace, or
wherein the residue stream comprises at least a portion of the feed stream, or both.

10. The method of claim 1 wherein separating the effluent stream from the hydrogen production process unit in the first PSA system that produces at least two product streams into at least the first high-pressure hydrogen stream enriched in hydrogen and the hydrogen depleted tail gas stream comprises separating the effluent stream from the hydrogen production process unit in the first PSA system that produces at least two product streams into the first high-pressure hydrogen stream enriched in hydrogen, the hydrogen depleted tail gas stream, and a second gas stream comprising a portion of the hydrogen, and at least a portion of at least one of the methane, carbon monoxide, and nitrogen, and further comprising at least one of:
introducing at least a portion of the first high-pressure hydrogen stream enriched in hydrogen into the bio-renewable conversion process; and
combusting at least a portions of the second gas stream m the hydrogen production process unit.

* * * * *